US012598033B2

(12) United States Patent
Ajami et al.

(10) Patent No.: US 12,598,033 B2
(45) Date of Patent: Apr. 7, 2026

(54) NETWORK CODING FOR MULTI-LINK DEVICE NETWORKS

(71) Applicant: QUALCOMM Incorporated, San Diego, CA (US)

(72) Inventors: Abdel Karim Ajami, San Diego, CA (US); Sai Yiu Duncan Ho, San Diego, CA (US); Alfred Asterjadhi, San Diego, CA (US); George Cherian, San Diego, CA (US); Abhishek Pramod Patil, San Diego, CA (US); Gaurang Naik, San Diego, CA (US); Yanjun Sun, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 369 days.

(21) Appl. No.: 17/713,183

(22) Filed: Apr. 4, 2022

(65) Prior Publication Data

US 2023/0318758 A1 Oct. 5, 2023

(51) Int. Cl.
H04L 1/20 (2006.01)
H04L 1/08 (2006.01)
H04L 1/1607 (2023.01)
H04L 1/1825 (2023.01)
H04W 52/02 (2009.01)

(52) U.S. Cl.
CPC .............. H04L 1/201 (2013.01); H04L 1/08 (2013.01); H04L 1/1621 (2013.01); H04L 1/1825 (2013.01); H04W 52/0216 (2013.01)

(58) Field of Classification Search
CPC ......... H04L 1/201; H04L 1/08; H04L 1/1621; H04L 1/1825; H04L 1/0057; H04L 1/1614; H04L 2001/0097; H04L 1/0076; H04W 52/0216
See application file for complete search history.

(56) References Cited

U.S. PATENT DOCUMENTS

| | | | | |
|---|---|---|---|---|
| 2009/0080579 A1* | 3/2009 | Fujii | ..................... | H04L 1/1893 375/347 |
| 2012/0246538 A1 | 9/2012 | Wu | | |
| 2018/0234114 A1* | 8/2018 | Soriaga | ................. | H04L 1/0058 |
| 2018/0367254 A1 | 12/2018 | Mohamad et al. | | |
| 2020/0336258 A1* | 10/2020 | Zhu | ........................ | H04L 1/1642 |
| 2021/0112615 A1* | 4/2021 | Huang | .................. | H04W 76/15 |

(Continued)

OTHER PUBLICATIONS

IEEE doc.: IEEE 802.11-22/0254r1; Shafin et. el.; Samsung Research America/Toshiba/ Panasonic. Title: Resolution for CIDs in CC36; Feb. 2022 (Year: 2022).*

(Continued)

*Primary Examiner* — Mohammed S Chowdhury
(74) *Attorney, Agent, or Firm* — Patterson + Sheridan, L.L.P.

(57) ABSTRACT

Certain aspects of the present disclosure provide a method of wireless communications by a first multi-link device (MLD). The method generally includes establishing multiple links with at least one second MLD, obtaining network coded packets over at least one of the multiple links, decoding the network coded packets, based on a network decoding algorithm, to recover one or more uncoded packets, generating feedback based on the decoding, and outputting, for transmission, the feedback to the at least one second MLD.

29 Claims, 13 Drawing Sheets

600

(56)                References Cited

U.S. PATENT DOCUMENTS

| | | | | |
|---|---|---|---|---|
| 2021/0120552 A1* | 4/2021 | Fang | ................ | H04W 72/0446 |
| 2021/0297988 A1 | 9/2021 | Zhou et al. | | |
| 2021/0392472 A1 | 12/2021 | Zhou et al. | | |
| 2022/0368481 A1* | 11/2022 | Yang | .................... | H04L 1/1642 |
| 2022/0376833 A1* | 11/2022 | Huang | ................. | H04L 1/1812 |
| 2023/0199846 A1* | 6/2023 | Xin | ...................... | H04L 1/1841 |
| | | | | 370/329 |
| 2023/0254897 A1* | 8/2023 | Xin | ...................... | H04L 1/1854 |
| | | | | 370/329 |
| 2023/0379749 A1* | 11/2023 | Canpolat | .......... | H04W 28/0263 |

OTHER PUBLICATIONS

IEEE; Hassan Ibrahim Zawia et.al. Title: A Survey of Medium Access Mechanisms for Providing Robust Audio Video Streaming in IEEE 802.11aa Standard; publication May 28, 2018. (Year: 2018).*

Ho D., et al., (Qualcomm) : "Resolution for CC36 CID 5950 Related to the QoS Characteristic Element" , CC36 CR for QoS Characteristics Element, IEEE Draft, 11-22-0200-00-00BE-CC36-CR-FOR-QOS-CHARACT ERISTICS-ELEMENT, IEEE-SA Mentor, Piscataway, NJ USA, vol. 802.11 EHT, 802.11be, Jan. 25, 2022, pp. 1-8, XP068188682, pp. 3-7.

Ho D., et al., (Qualcomm) : "Resolution for CIDs Related to TSPEC", CC36 CR for TSPEC element, IEEE Draft, 11-21-1407-03-00BE-CC36-CR-FOR-TSPEC-ELEMENT, IEEE-SA Mentor, Piscataway, NJ USA, vol. 802.11 EHT, 802.11be, No. 3, Nov. 14, 2021, pp. 1-11, XP068198088, pp. 3, 4, pp. 6, 7.

Huang G., et al., (Huawei) : "CC36 CR on 5196 and 7620", IEEE Draft, 11-21-1273-05-00BE-CC36-CR-ON-5196, IEEE-SA Mentor, Piscataway, NJ USA, vol. 802.11 EHT, 802.11be, No. 5, 2021-11-27, 10 Pages, XP068189802, Retrieved Date [Mar. 23, 2022], pp. 2,3, pp. 5, 7-8.

International Search Report and Written Opinion—PCT/US2023/015543—ISA/EPO—Aug. 14, 2023.

Partial International Search Report—PCT/US2023/015543—ISA/EPO—Jun. 12, 2023.

* cited by examiner

800

| Value | MSDU Delivery Ratio values |
|:---:|:---:|
| 0 | 90% |
| 1 | 95% |
| 2 | 96% |
| 3 | 97% |
| 4 | 98% |
| 5 | 99% |
| 6 | 99.9% |
| 7 | 99.99% |
| 8 | 99.999% |
| 9 | 99.9999% |

900

950

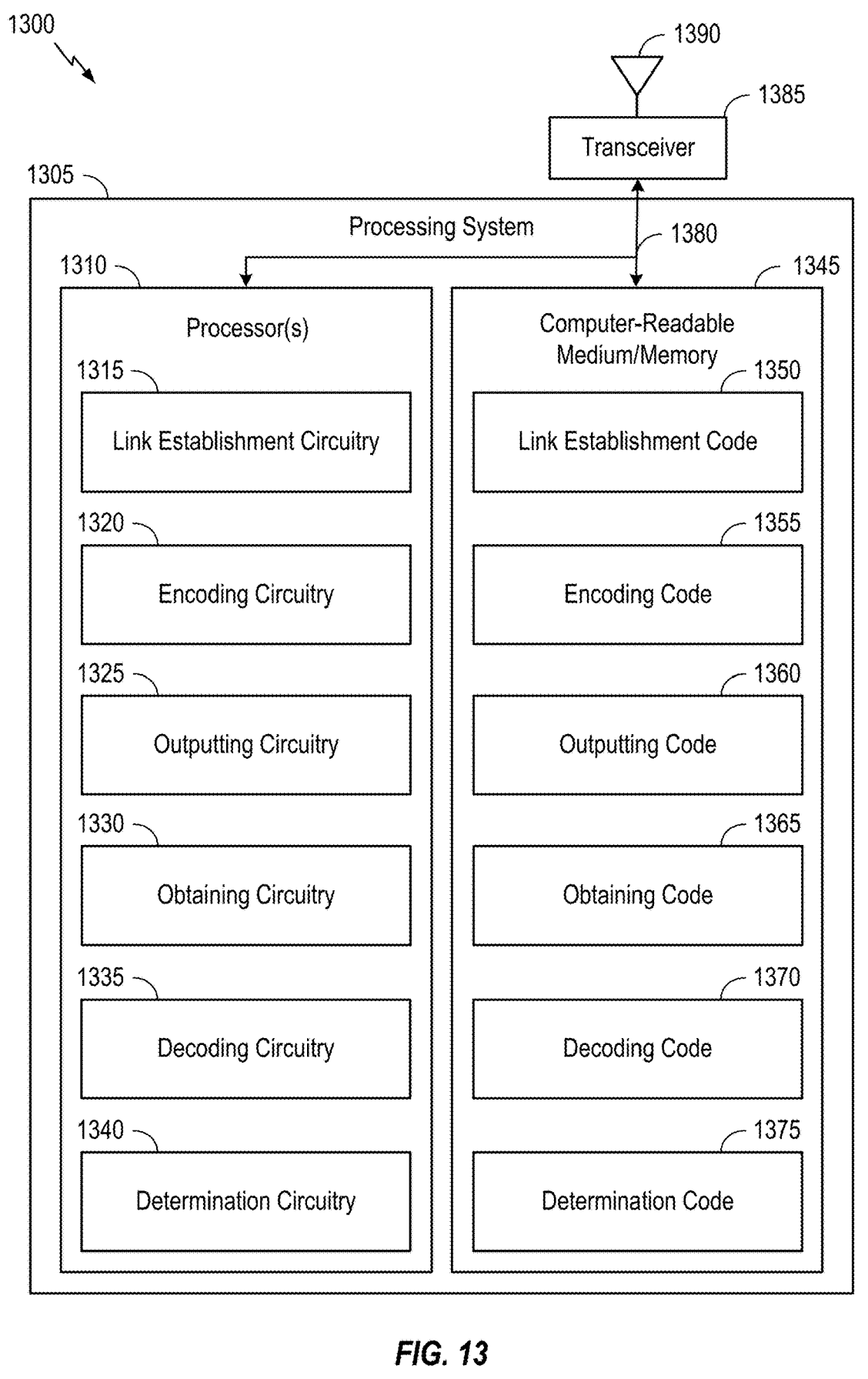

1300

1390

1385

Transceiver

1305

Processing System

1380

1310

Processor(s)

1315

Link Establishment Circuitry

1320

Encoding Circuitry

1325

Outputting Circuitry

1330

Obtaining Circuitry

1335

Decoding Circuitry

1340

Determination Circuitry

1345

Computer-Readable Medium/Memory

1350

Link Establishment Code

1355

Encoding Code

1360

Outputting Code

1365

Obtaining Code

1370

Decoding Code

1375

Determination Code

*FIG. 13*

NETWORK CODING FOR MULTI-LINK DEVICE NETWORKS

BACKGROUND

Field of the Disclosure

Aspects of the present disclosure relate to wireless communications, and more particularly, to techniques for utilizing network coding in wireless networks with multi-link devices (MLDs).

Description of Related Art

Wireless communications networks are widely deployed to provide various communications services such as voice, video, packet data, messaging, broadcast, etc. These wireless networks may be multiple-access networks capable of supporting multiple users by sharing the available network resources. Examples of such multiple-access networks include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

In order to address the issue of increasing bandwidth requirements that are demanded for wireless communications systems, different schemes are being developed to allow multiple user terminals to communicate with a single access point by sharing the channel resources while achieving high data throughputs. Multiple Input Multiple Output (MIMO) technology represents one such approach that has emerged as a popular technique for communications systems. MIMO technology has been adopted in several wireless communications standards such as the Institute of Electrical and Electronics Engineers (IEEE) 802.11 standard. The IEEE 802.11 denotes a set of Wireless Local Area Network (WLAN) air interface standards developed by the IEEE 802.11 committee for short-range communications (such as tens of meters to a few hundred meters).

SUMMARY

One aspect provides a method of wireless communications by a first multi-link device (MLD). The method includes establishing multiple links with at least one second MLD; obtaining network coded packets over at least one of the multiple links; decoding the network coded packets, based on a network decoding algorithm, to recover one or more uncoded packets; generating feedback based on the decoding; and outputting, for transmission, the feedback to the at least one second MLD.

Another aspect provides a method of wireless communications by a second MLD. The method includes establishing at least one link with at least one first MLD; encoding one or more uncoded packets to generate network coded packets, based on a network coding algorithm; and outputting, for transmission, the network coded packets over the at least one link.

Other aspects provide: an apparatus operable, configured, or otherwise adapted to perform any one or more of the aforementioned methods and/or those described elsewhere herein; a non-transitory, computer-readable media comprising instructions that, when executed by a processor of an apparatus, cause the apparatus to perform the aforementioned methods as well as those described elsewhere herein; a computer program product embodied on a computer-readable storage medium comprising code for performing the aforementioned methods as well as those described elsewhere herein; and/or an apparatus comprising means for performing the aforementioned methods as well as those described elsewhere herein. By way of example, an apparatus may comprise a processing system, a device with a processing system, or processing systems cooperating over one or more networks.

The following description and the appended figures set forth certain features for purposes of illustration.

BRIEF DESCRIPTION OF DRAWINGS

The appended figures depict certain features of the various aspects described herein and are not to be considered limiting of the scope of this disclosure.

FIG. 13 depicts aspects of an example communications device.

DETAILED DESCRIPTION

Figure 1:
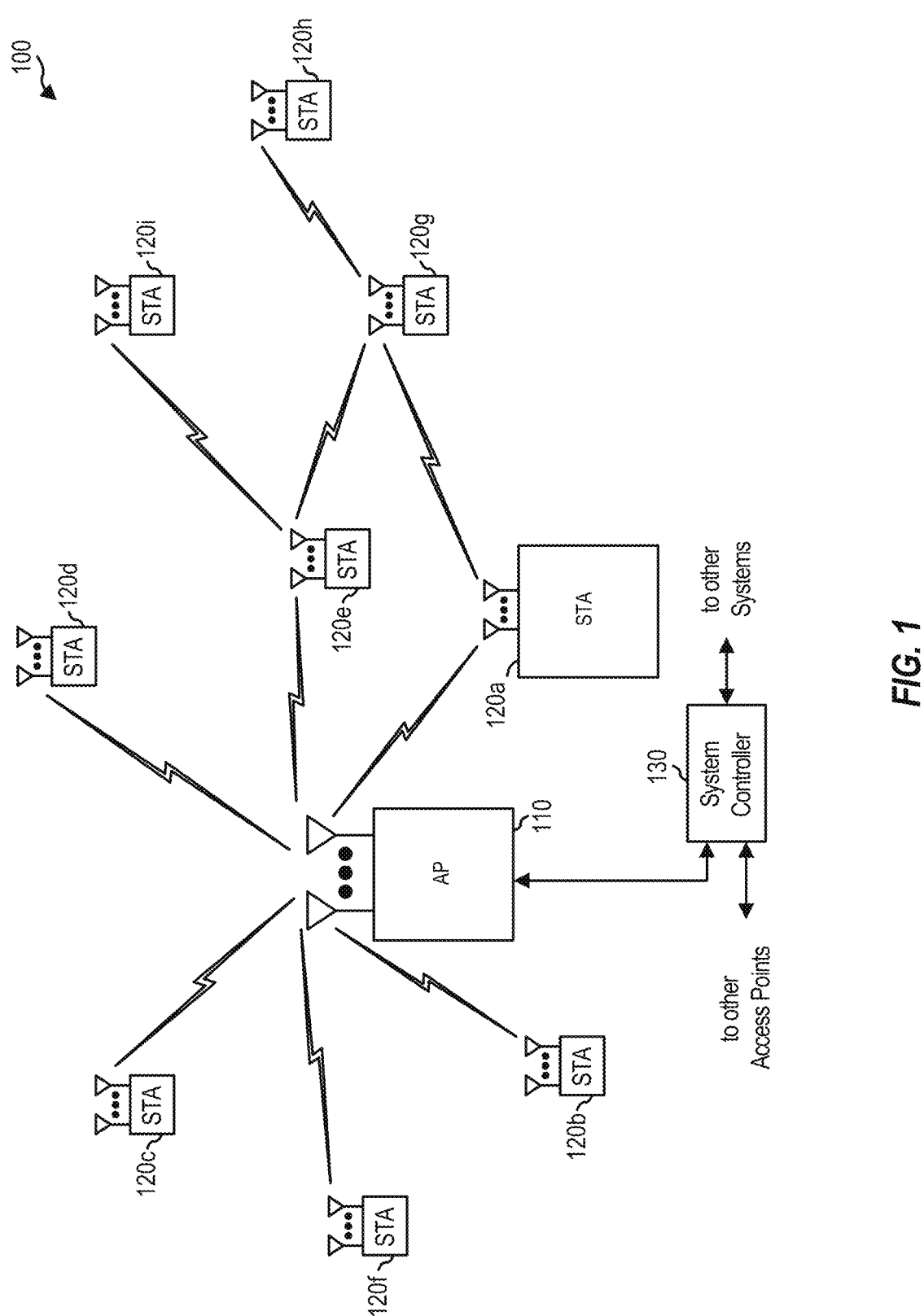
FIG. 1 depicts an example wireless communications network.

Aspects of the present disclosure relate to wireless communications, and more particularly, to techniques for utilizing network coding in wireless networks with multi-link devices (MLDs).

A multi-link device (MLD) generally refers to a single device or equipment that includes two or more station (STA) instances or entities, implemented in a physical (PHY) layer and/or medium access control (MAC) layer and configured to communicate on multiple (separate) wireless links. Devices operating as MLDs are said to perform multi-link operation (MLO) In some examples, each MLD may include a single higher layer entity, such as a MAC Service Access Point (SAP) that may assign MAC protocol data units (MPDUs) for transmission by the separate STA instances.

MLO may be used in certain applications, such as extended reality (XR) gaming, where traffic delivery may have relatively stringent latency requirements and reliability requirements. In certain systems (e.g., 802.11 be), MLO may be introduced where an MLD that is not acting as an access point (a non-AP MLD) can associate to an AP over multiple links. This scenario may be referred to as collocated MLO. In another example of MLO deployment, in Next Generation Wi-Fi networks (e.g., Wi-Fi 8), Multi-AP Association may be used that enables multiple non-collocated APs to serve a single non-AP MLD. This scenario may be referred to as non-collocated MLO.

In some cases, in order to enhance the reliability of latency sensitive traffic, a STA may send duplicate packets, such as medium access control (MAC) protocol data units (MPDUs), over multiple links in order to ensure that the target reliability (e.g., 99.9%) is achieved for the intended delay budget. Unfortunately, simple duplication of MPDUs over multiple links may result in excessive network load, reduced capacity, and may trigger many retransmissions in case of bad link conditions.

Aspects of the present disclosure, however, propose incorporating network coding into MLO scenarios, in order to achieve stringent latency and reliability requirements. Network coding generally refers to a technique where operations (e.g., algebraic algorithms), are performed on packets as they pass through nodes within a network. This is in contrast to traditional routing networks, where packets are simply cached and then forwarded to the next node downstream in the network. Network coding typically merges relevant messages at a node, using a given encoding, then forwards the accumulated result to a destination/receiver for decoding.

Using network coding, an AP or non-AP MLD STA may transmit network coded MPDUs over multiple links (and can be applied in both in collocated/non-collocated MLO). By using network coding, redundant MPDUs may help improve reliable delivery of source packets, allowing the STA to avoid unnecessary re-transmissions that could significantly increase the delay of MPDU reception, especially when experiencing bad link conditions (e.g., caused by link blockage or edge users).

Introduction to Wireless Communications Networks

Various aspects of the disclosure are described more fully hereinafter with reference to the accompanying drawings. This disclosure may, however, be implemented in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be implemented by one or more elements of a claim.

The word "exemplary" is used herein to mean "serving as an example, instance, or illustration." Any aspect described herein as "exemplary" is not necessarily to be construed as preferred or advantageous over other aspects.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

The techniques described herein may be used for various broadband wireless communications systems, including communications systems that are based on an orthogonal multiplexing scheme. Examples of such communications systems include Spatial Division Multiple Access (SDMA), Time Division Multiple Access (TDMA), Orthogonal Frequency Division Multiple Access (OFDMA) systems, Single-Carrier Frequency Division Multiple Access (SC-FDMA) systems, and so forth. An SDMA system may utilize sufficiently different directions to simultaneously transmit data belonging to multiple user terminals. A TDMA system may allow multiple user terminals to share the same frequency channel by dividing the transmission signal into different time slots, each time slot being assigned to different user terminal. An OFDMA system utilizes orthogonal frequency division multiplexing (OFDM), which is a modulation technique that partitions the overall system bandwidth into multiple orthogonal sub-carriers. These sub-carriers may also be called tones, bins, etc. With OFDM, each sub-carrier may be independently modulated with data. An SC-FDMA system may utilize interleaved FDMA (IFDMA) to transmit on sub-carriers that are distributed across the system bandwidth, localized FDMA (LFDMA) to transmit on a block of adjacent sub-carriers, or enhanced FDMA (EFDMA) to transmit on multiple blocks of adjacent sub-carriers. In general, modulation symbols are sent in the frequency domain with OFDM and in the time domain with SC-FDMA.

The teachings herein may be incorporated into (such as implemented within or performed by) a variety of wired or wireless apparatuses (such as nodes). In some aspects, a wireless node implemented in accordance with the teachings herein may comprise an access point or an access terminal.

An access point ("AP") may comprise, be implemented as, or known as a Node B, Radio Network Controller ("RNC"), evolved Node B (eNB), Base Station Controller ("BSC"), Base Transceiver Station ("BTS"), Base Station ("BS"), Transceiver Function ("TF"), Radio Router, Radio Transceiver, Basic Service Set ("BSS"), Extended Service Set ("ESS"), Radio Base Station ("RBS"), or some other terminology.

An access terminal ("AT") may comprise, be implemented as, or known as a subscriber station, a subscriber unit, a mobile station (MS), a remote station, a remote terminal, a user terminal (UT), a user agent, a user device, user equipment (UE), a user station, or some other terminology. In some implementations, an access terminal may comprise a cellular telephone, a cordless telephone, a Session Initiation Protocol ("SIP") phone, a wireless local loop ("WLL") station, a personal digital assistant ("PDA"), a handheld device having wireless connection capability, a Station ("STA"), or some other suitable processing device connected to a wireless modem. Accordingly, one or more aspects taught herein may be incorporated into a phone (such as a cellular phone or smart phone), a computer (such as a laptop), a tablet, a portable communications device, a portable computing device (such as a personal data assistant), an entertainment device (such as a music or video device, or a satellite radio), a global positioning system (GPS) device, or any other suitable device that is configured to communicate via a wireless or wired medium. In some aspects, the node is a wireless node. Such wireless node may provide, for example, connectivity for or to a network (such as a wide area network such as the Internet or a cellular network) via a wired or wireless communications link.

Example Wireless Communications System

FIG. 1 is a diagram illustrating an example wireless communication system 100, in accordance with certain aspects of the present disclosure. System 100 may be a multiple-input multiple-output (MIMO)/multi-link operation (MLO) system 100.

For simplicity, only one AP 110 is shown in FIG. 1. An AP is generally a fixed station that communicates with the wireless STAs and may also be referred to as a base station (B S) or some other terminology. A wireless STA may be fixed or mobile and may also be referred to as a mobile STA, a wireless device, or some other terminology. AP 110 may communicate with one or more wireless STAs 120 at any given moment on the downlink (DL) and/or uplink (UL). The DL (i.e., forward link) is the communication link from AP 110 to the wireless STAs 120, and the UL (i.e., reverse link) is the communication link from the wireless STAs 120 to AP 110. A wireless STA 120 may also communicate peer-to-peer with another wireless STA 120, for example, via a direct link such as a tunneled direct link setup (TDLS). A system controller 130 may be in communication with and provide coordination and control for the access points.

While portions of the following disclosure will describe wireless STAs 120 capable of communicating via Spatial Division Multiple Access (SDMA), for certain aspects, the wireless STAs 120 may also include some wireless STAs 120 that do not support SDMA. Thus, for such aspects, an AP 110 may be configured to communicate with both SDMA and non-SDMA wireless STAs 120. This approach may conveniently allow older versions of wireless STAs 120 ("legacy" stations) to remain deployed in an enterprise, extending their useful lifetime, while allowing newer SDMA wireless STAs 120 to be introduced as deemed appropriate.

System 100 employs multiple transmit and multiple receive antennas for data transmission on the DL and UL. AP 110 is equipped with Nap antennas and represents the multiple-input (MI) for DL transmissions and the multiple-output (MO) for UL transmissions. A set of K selected wireless stations 120 collectively represents the multiple-output for DL transmissions and the multiple-input for UL transmissions. For pure SDMA, it is desired to have $N_{ap} \geq K \geq 1$ if the data symbol streams for the K wireless STAs are not multiplexed in code, frequency or time by some means. K may be greater than $N_{ap}$ if the data symbol streams can be multiplexed using TDMA technique, different code channels with CDMA, disjoint sets of subbands with OFDM, and so on. Each selected wireless STA transmits user-specific data to and/or receives user-specific data from the access point. In general, each selected wireless STA may be equipped with one or multiple antennas (i.e., Nsta≥1). The K selected wireless STAs can have the same or different number of antennas.

System 100 may be a time division duplex (TDD) system or a frequency division duplex (FDD) system. For a TDD system, the DL and UL share the same frequency band. For an FDD system, the DL and UL use different frequency bands. System 100 may also utilize a single carrier or multiple carriers for transmission. Each wireless STA may be equipped with a single antenna or multiple antennas. System 100 may also be a TDMA system if wireless STAs 120 share the same frequency channel by dividing transmission/reception into different time slots, each time slot being assigned to a different wireless STA 120.

Figure 2:
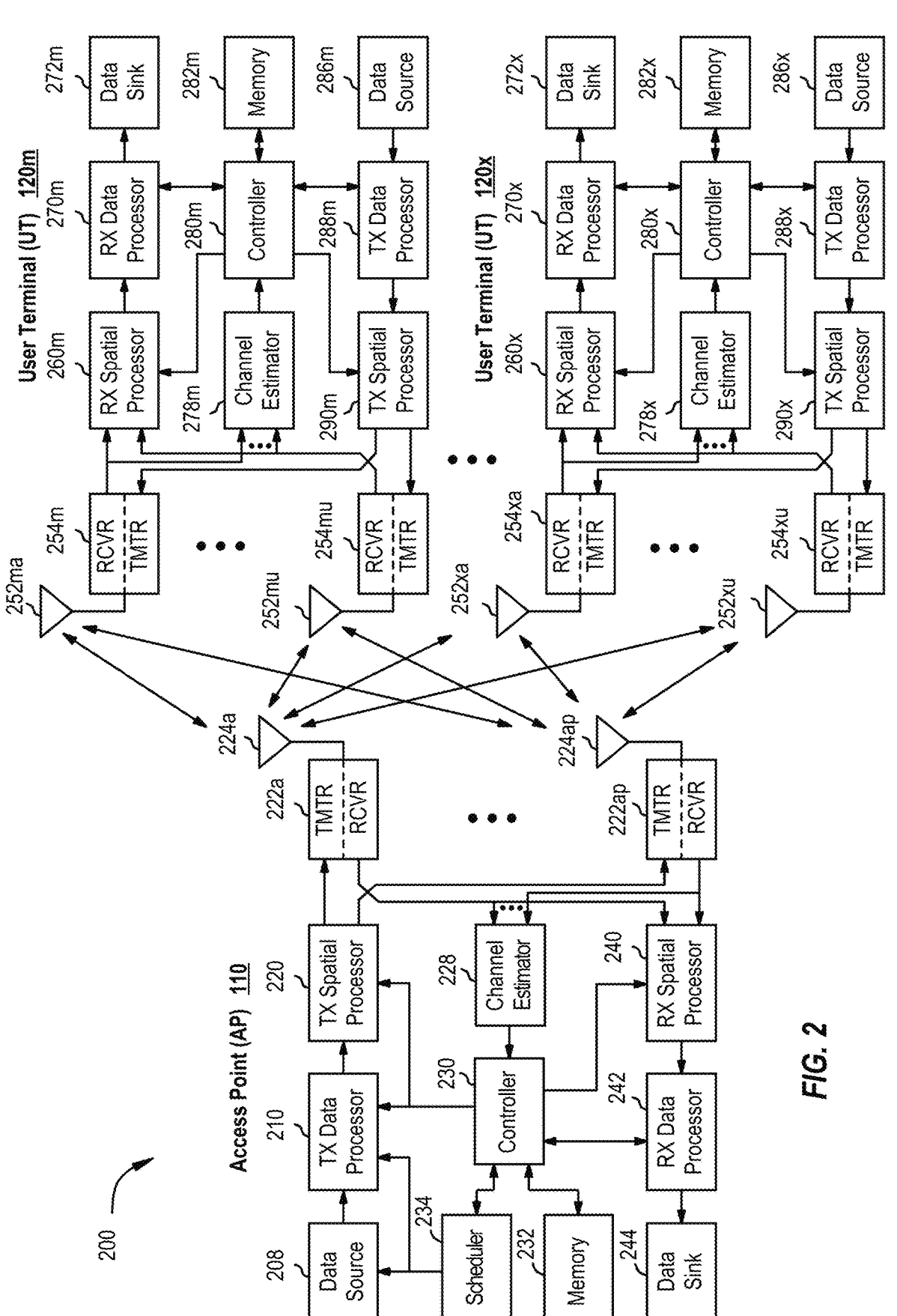
FIG. 2 depicts an example disaggregated base station architecture.

FIG. 2 illustrates a block diagram of AP 110 and two wireless STAs 120m and 120x in a MIMO/MLO system, such as system 100, in accordance with certain aspects of the present disclosure. In certain aspects, AP 110 and/or wireless STAs 120m and 120x may perform various techniques to ensure that a non-AP MLD is able to receive a group addressed frame. For example, AP 110 and/or wireless STAs 120m and 120x may include a respective association manager as described herein with respect to FIG. 1.

AP 110 is equipped with Nap antennas 224a through 224t. Wireless STA 120m is equipped with Nsta,m antennas 252ma through 252mu, and wireless STA 120x is equipped with Nsta,x antennas 252xa through 252xu. AP 110 is a transmitting entity for the DL and a receiving entity for the UL. Each wireless STA 120 is a transmitting entity for the UL and a receiving entity for the DL. As used herein, a "transmitting entity" is an independently operated apparatus or device capable of transmitting data via a wireless channel, and a "receiving entity" is an independently operated apparatus or device capable of receiving data via a wireless channel. The term communication generally refers to transmitting, receiving, or both. In the following description, the subscript "DL" denotes the downlink, the subscript "UL" denotes the uplink, NUL wireless STAs are selected for simultaneous transmission on the uplink, NDL wireless STAs are selected for simultaneous transmission on the downlink, NUL may or may not be equal to NDL, and NUL and NDL may be static values or can change for each scheduling interval. The beam-steering or some other spatial processing technique may be used at the access point and wireless station.

On the UL, at each wireless STA 120 selected for UL transmission, a transmit (TX) data processor 288 receives traffic data from a data source 286 and control data from a controller 280. TX data processor 288 processes (e.g., encodes, interleaves, and modulates) the traffic data for the wireless station based on the coding and modulation schemes associated with the rate selected for the wireless STA and provides a data symbol stream. A TX spatial processor 290 performs spatial processing on the data symbol stream and provides Nsta,m transmit symbol streams for the Nsta,m antennas. Each transceiver (TMTR) 254 receives and processes (e.g., converts to analog, amplifies, filters, and frequency upconverts) a respective transmit symbol stream to generate an uplink signal. Nsta,m transceivers 254 provide Nsta,m UL signals for transmission from Nsta,m antennas 252 to AP 110.

NUL wireless STAs may be scheduled for simultaneous transmission on the uplink. Each of these wireless STAs performs spatial processing on its data symbol stream and transmits its set of transmit symbol streams on the UL to the AP 110.

At AP 110, Nap antennas 224a through 224ap receive the UL signals from all NUL wireless STAs transmitting on the UL. Each antenna 224 provides a received signal to a respective transceiver (RCVR) 222. Each transceiver 222 performs processing complementary to that performed by transceiver 254 and provides a received symbol stream. A receive (RX) spatial processor 240 performs receiver spatial processing on the Nap received symbol streams from Nap transceiver 222 and provides NUL recovered UL data symbol streams. The receiver spatial processing is performed in accordance with the channel correlation matrix inversion (CCMI), minimum mean square error (MMSE), soft interference cancellation (SIC), or some other technique. Each recovered UL data symbol stream is an estimate of a data symbol stream transmitted by a respective wireless station. An RX data processor 242 processes (e.g., demodulates, deinterleaves, and decodes) each recovered uplink data symbol stream in accordance with the rate used for that stream to obtain decoded data. The decoded data for each wireless STA may be provided to a data sink 244 for storage and/or a controller 230 for further processing.

On the DL, at AP 110, a TX data processor 210 receives traffic data from a data source 208 for NDL wireless stations scheduled for downlink transmission, control data from a controller 230, and possibly other data from a scheduler 234. The various types of data may be sent on different transport channels. TX data processor 210 processes (e.g., encodes, interleaves, and modulates) the traffic data for each wireless station based on the rate selected for that wireless station. TX data processor 210 provides NDL DL data symbol streams for the NDL wireless stations. A TX spatial processor 220 performs spatial processing (such as a precoding or beamforming, as described in the present disclosure) on the NDL DL data symbol streams, and provides Nap transmit symbol streams for the Nap antennas. Each transceiver 222 receives and processes a respective transmit symbol stream to generate a DL signal. Nap transceivers 222 providing Nap DL signals for transmission from Nap antennas 224 to the wireless STAs.

At each wireless STA 120, Nsta,m antennas 252 receive the Nap DL signals from access point 110. Each transceiver 254 processes a received signal from an associated antenna 252 and provides a received symbol stream. An RX spatial processor 260 performs receiver spatial processing on Nsta,m received symbol streams from Nsta,m transceiver 254 and provides a recovered DL data symbol stream for the wireless station. The receiver spatial processing is performed in accordance with the CCMI, MMSE or some other technique. An RX data processor 270 processes (e.g., demodulates, deinterleaves and decodes) the recovered DL data symbol stream to obtain decoded data for the wireless station.

At each wireless STA 120, a channel estimator 278 estimates the DL channel response and provides DL channel estimates, which may include channel gain estimates, SNR estimates, noise variance and so on. Similarly, a channel estimator 228 estimates the UL channel response and provides UL channel estimates. Controller 280 for each wireless STA typically derives the spatial filter matrix for the wireless station based on the downlink channel response matrix Hdn,m for that wireless station. Controller 230 derives the spatial filter matrix for the AP based on the effective UL channel response matrix Hup,eff. Controller 280 for each wireless STA may send feedback information (e.g., the downlink and/or uplink eigenvectors, eigenvalues, SNR estimates, and so on) to the AP. Controllers 230 and 280 also control the operation of various processing units at AP 110 and wireless STA 120, respectively.

Overview of Network Coding

Aspects of the present disclosure relate to wireless communications, and more particularly, to techniques for utilizing network coding for more efficient multicast transmission. As will be described in greater detail below, in some cases, a radio link layer (RLC) network coding sublayer may be used to increase efficiency and reliability while satisfying latency requirements.

Network coding generally refers to a technique where operations (e.g., algebraic algorithms), are performed on packets as they pass through nodes within a network. This is in contrast to traditional routing networks, where packets are simply cached and then forwarded to the next node downstream in the network. Network coding typically merges relevant messages at a node, using a given encoding, then forwards the accumulated result to a destination/receiver for decoding.

Figure 3A:
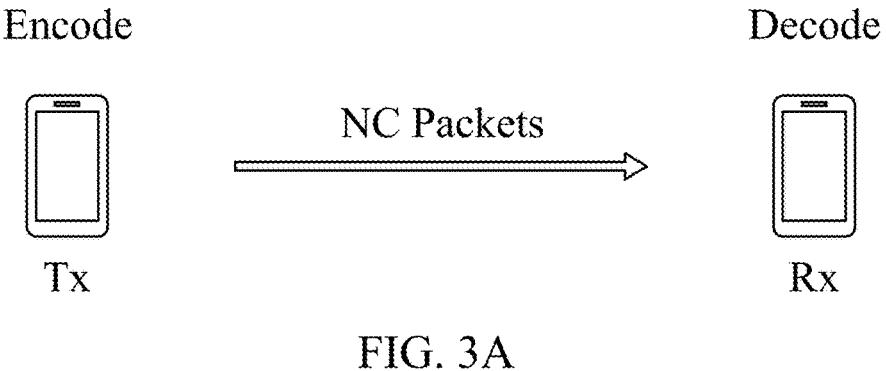
FIG. 3A and FIG. 3B illustrate an example single hop network coding example.
Figure 3B:
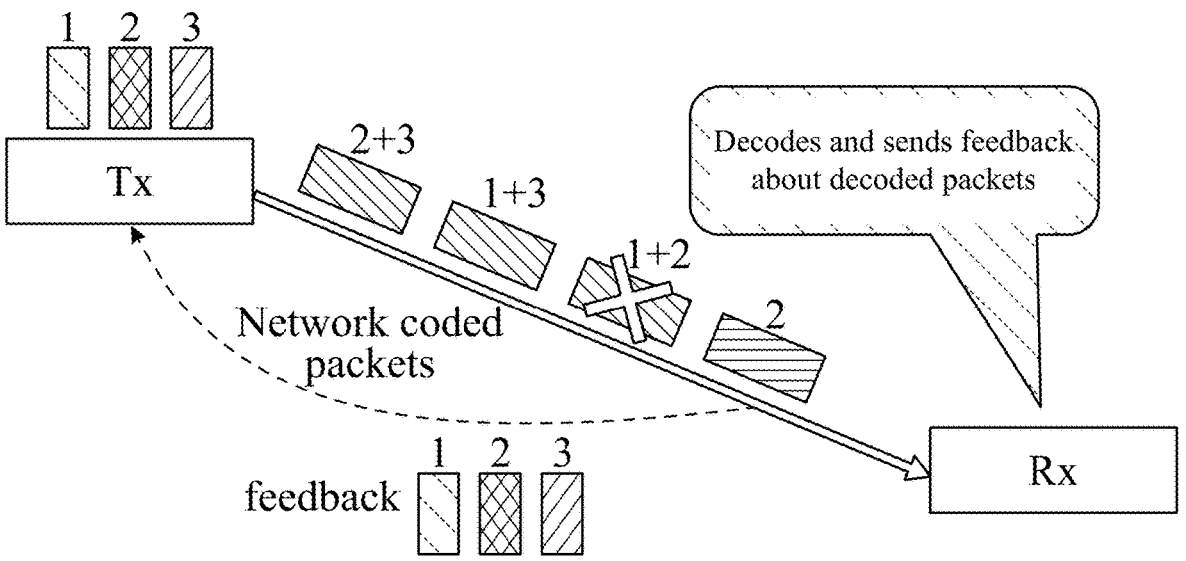

FIGS. 3A and 3B illustrate a simple single hop scenario utilizing NC. As shown in FIG. 3A, a transmitter device (Tx) generates and sends network coded packets to a receiver device (Rx). The transmitter device Tx (also referred to as a transmitter node, transmitter, encoder node, or encoder) and/or the receiver device Rx (also referred to as a receiver node, receiver, decoder node, or decoder) may be any type of UE, base station, an integrated access and backhaul (IAB) device, and/or the like.

As shown in FIG. 3B, the transmitter device Tx may generate the network coding packets from a set of original (or source) packets (e.g., packet 1 (p1), packet 2 (p2), and packet 3 (p3)). As illustrated, the network coding packets may be the same as a source packet or may include some combination of source packets (e.g., a linear combination of a subset of the source packets). Network coding may be performed using any type of network coding scheme, such as fountain coding, linear network coding, random linear network coding, Luby transform (LT) network coding, Raptor network coding, and/or the like.

The number of encoded packets is typically greater than the number of source packets, which provides redundancy and increases reliability. In the example illustrated in FIG. 3B, the transmitter device Tx encodes K original packets (e.g., K=3) into N network coded packets (e.g., N=4). As shown, the three source packets (p1, p2, and p3) are encoded into the four network coded packets: p2, p1+p2, p1+p3, and p2+p3.

The redundant information carried in the encoded packets may help the receiver device Rx recover the source packets even if not all of the network coded packets are successfully decoded. For example, assuming the receiver device Rx does not successfully decode network coded packet p1+p2 (as indicated by the X), the receiver device Rx may still be able to recover the source packets, as there is sufficient information in the other network coded packets (p2, p1+p3, and p2+p3). For example, the receiver device Rx may first decode network coded packet p2. Using the information for packet p2, the receiver may obtain packet p3 after decoding network coded packet p2+p3 (e.g., because the receiver has already decoded p2 and can use combining techniques to obtain p3 from p2+p3). In a similar manner, the receiver device Rx can obtain packet p1 from the network coded packet p1+p3 (because the receiver device Rx has already decoded packet p3 and can use combining to obtain packet p1 from network coded packet p1+p3).

As illustrated, in some cases, the receiver device Rx may provide feedback. In this example, the receiver device Rx indicates the three source packets (p1, p2, and p3) were successfully decoded. As will be described in greater detail below, such feedback may be used to update the network coded scheme.

Figure 4:
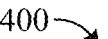
FIG. 4 illustrates an example multi-hop network coding example.
Figure 4:
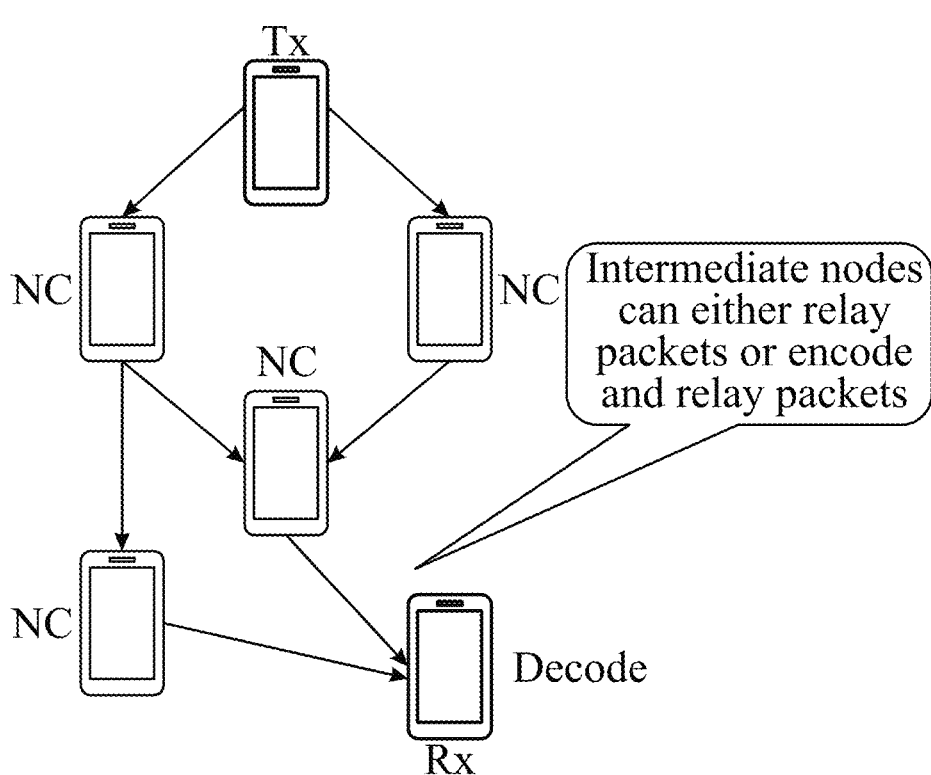

As shown in FIG. 4, the network coded coding scheme can be extended to a multi-hop deployment. In such cases, intermediate nodes (indicated by NC in FIG. 4) can either relay packets or encode and relay network coded packets.

Overview of Multi-Link Devices

As initially described above, a multi-link device (MLD) generally refers to a single device or equipment that includes two or more station (STA) instances or entities, implemented in a physical (PHY)/medium access control (MAC) layer and configured to communicate on separate wireless links. In some examples, each MLD may include a single higher layer entity, such as a MAC Service Access Point (SAP) that may assign MAC protocol data units (MPDUs) for transmission by the separate STA instances.

Figure 5:
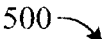
FIG. 5 shows a block diagram of an example multi-link device (MLD) deployment.
Figure 5:
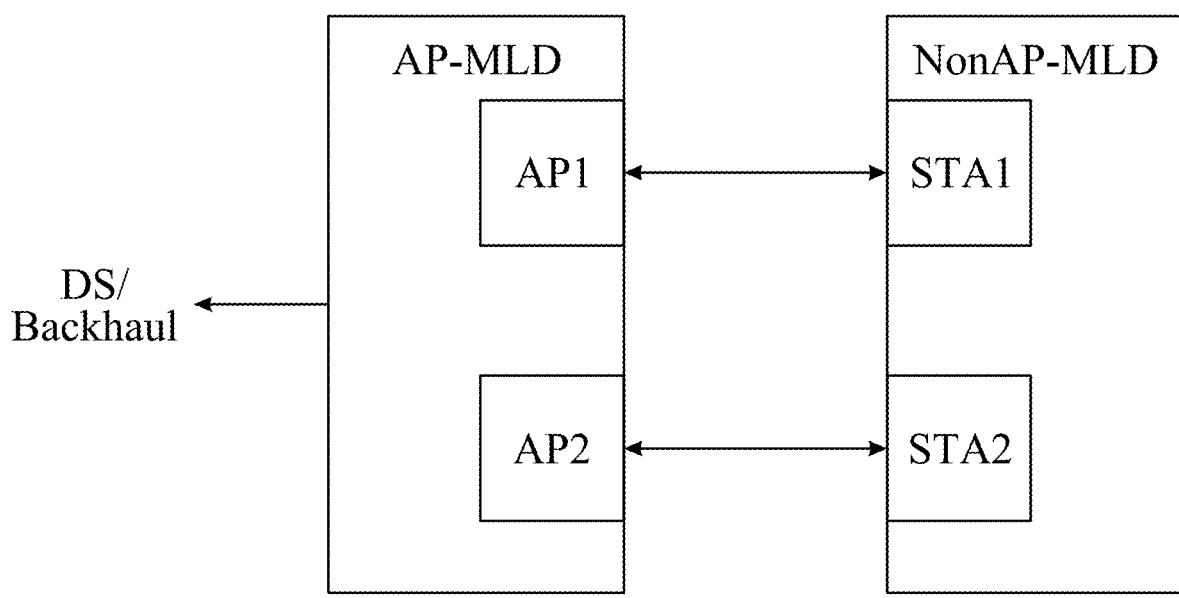

FIG. 5 shows a block diagram of an example MLD deployment. As shown in FIG. 5, an access point (AP) MLD may communicate with a non-AP MLD. Each of the AP MLD and non-AP MLD may include at least two STA entities (hereinafter also referred to simply as "STAs") that may communicate with associated STAs of another MLD. In an AP MLD, the STAs may be AP STAs (STAs serving as APs or simply "APs"). In a non-AP MLD, the STAs may be non-AP STAs (STAs not serving as APs). As also described above, MLDs may utilize multi-link aggregation (MLA) (which includes packet level aggregation), whereby MPDUs from a same traffic ID (TID) may be sent via two or more wireless links.

Various modes of communication may be employed in MLD implementations. For example, a MLD may communicate in an Asynchronous (Async) mode or a Synchronous (Sync) mode.

In the Async mode, a STA/AP may count down (for example, via a random backoff (RBO)) on both wireless links. A physical layer convergence protocol (PLCP) protocol data units (PPDU) start/end may happen independently on each of the wireless links. As a result, Async mode may potentially provide latency and aggregation gains. In certain cases, relatively complex (and costly) filters may be needed (for example, in the case of 5 GHz+6 GHz aggregation).

In the Sync mode, a STA/AP may also count down on both wireless links (e.g., assuming Link 1 and Link 2). If a first link (e.g., Link 1) wins the medium, both links may transmit PPDUs at the same time. Accordingly, this mode may need some restrictions to minimize in-device interference.

The Sync mode may work in 5 GHz+6 GHz aggregation and may require relatively low-filter performance, while still providing latency and aggregation gains. However, due to its tiled architecture, this latency and aggregation gains may be hard to achieve.

Although not shown, a third mode of communication may include a Basic (for example, multi-primary with single link transmission) mode. In the Basic mode, a STA/AP may also count down on both wireless links. However, transmission may only occur on the wireless link that wins the medium. The other wireless link may be blocked by in-device interference greater than −62 decibels per milliwatt (dBm). No aggregation gains may be realized in this mode.

Aspects Related to Network Coding for Multi-Link Device Networks

Aspects of the present disclosure propose incorporating network coding into MLO scenarios. For example, using network coding, an AP or non-AP MLD STA may transmit network coded MPDUs over multiple links (and can be applied in both in collocated/non-collocated MLO). By using network coding, redundant MPDUs may help improve reliable delivery of source packets, allowing the STA to avoid unnecessary re-transmissions that could significantly increase the delay of MPDU reception, especially when experiencing bad link conditions.

Figure 6:
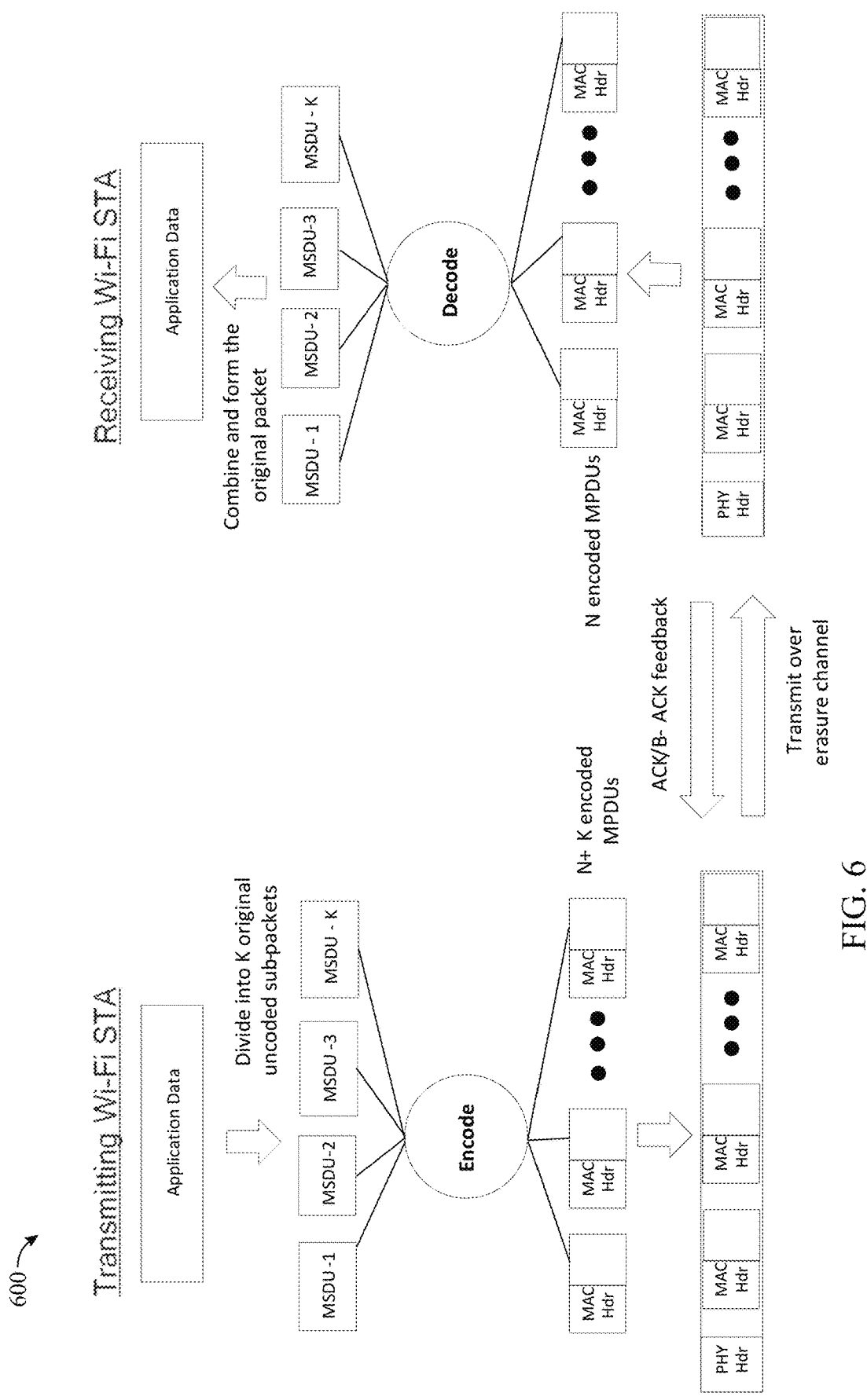
FIG. 6 depicts an example network coding scenario, in accordance with aspects of the present disclosure.

As illustrated in FIG. 6, in what may be considered a baseline scenario, a Wi-Fi STA transmits K original MSDUs (using K MPDUs) to another Wi-Fi STA. If the transmission was not successful (e.g., as indicated by block acknowledgment BA feedback), the Wi-Fi STA re-transmits the same MPDU until it get acknowledged by the receiver.

As noted above, however, in case of network coding, a transmitting Wi-Fi STA may encode multiple MSDUs to generate linearly encoded MPDUs.

As illustrated in FIG. 6, depending on the required redundancy, the STA will transmit K+N linearly encoded MPDUs along with the coding vectors. As a result, the receiving STA will need to receive only N' MPDUs (where N' is greater than or equal to K) in order to decode the encoded packets and recover the original uncoded MSDUs.

The value of N may be determined, for example, by the particular network coding function, targeted error probability, and/or channel conditions. The size of MSDUs may be predefined and, in some cases, the value of K may be optimized using the SDU size and a generator matrix. In some cases, the value of N and/or K may be optimized based on one or more of the following parameters: targeted error rate, channel condition, network coding functions, device computation resources, target reliability, and delay budget.

The K+N MPDUs may be output for transmission over multiple links (e.g., different component carriers and/or different RATs). At the receiver-side, a network decoding sublayer may process the network coded packets, performing network decoding operations corresponding to the encoding operations described above, and generating (acknowledgment or block-acknowledgment) feedback to the transmitter (or multiple transmitters).

There are various options for incorporating network coding in an MLD network, in accordance with aspects of the present disclosure.

According to a first option, network coding may be used to provide dynamic redundancy without re-transmissions. According to this option, transmitting STA may transmit a fixed number of MPDUs (K+N) without any retransmissions. Potential benefits of this option include a bounded delay and the ability to adapt redundancy (e.g., by adjusting the value of N) based on link conditions.

According to a second option, network coding may be used to provide dynamic redundancy with re-transmissions. According to this second option, a transmitting STA may initially transmit K+N MDPUs. Based on feedback received from the receiving STA, the transmitting STA may then selectively re-transmit particular MPDUs to help the receiving STA decode the original MSDUs. Potential benefits of this option include potentially better reliability (e.g., a higher probability to recover original MPDUs) and the ability to adapt redundancy (e.g., by adjusting the value of N) based on link conditions.

This second option, providing dynamic redundancy with re-transmissions Option 2 may be either transmitter-driven or receiver-driven.

For example, a transmitter-driven approach to retransmissions may rely on feedback provided by an existing Block-Ack (BA) mechanism. Based on the indicated ACK'ed MPDUs, the transmitter may process corresponding coded vectors and determine if the receiver needs additional redundant MDPUs. Potential benefits of this transmitter-driven approach include that the transmitter may need to re-transmit fewer or no MPDUs, compared to the baseline mechanism described above, albeit at the cost of additional processing at the transmitter. This approach may be suitable for downlink transmissions (e.g., with the network coding performed at the AP STA).

In a receiver-driven approach to retransmissions, in addition to transmitting the MPDUs, the transmitter may also indicate the sequence numbers of uncoded packets (e.g., of the K MSDUs). In this case, as feedback, the receiver may indicate the correctly recovered uncoded packets (e.g., using an additional bitmap where different bits map to different sequence numbers). Based on the feedback, the transmitting station may selectively re-transmit particular MPDUs to help the receiver decode the original MSDUs (that were not indicated as being successfully ACK' d). Potential benefits of this receiver-driven approach include less processing compared to the transmitter-driven option described above. Further, this approach may be suitable for both downlink and uplink, albeit at the cost of additional signaling (e.g., in terms of sequence numbers and the feedback bitmap).

For the receiver-driven approach to retransmissions, the receiver may forward the MPDUs to the upper layers even if there are holes (missed MPDU sequence numbers) in the Receive Reordering Buffer. This can be done after successful decoding of the network coded packets. The receiver may also acknowledge all the corresponding MPDUs, so that the transmitter can move on and not re-transmit these MPDUs.

Aspects of the present disclosure also provide various options for network coding activation and corresponding signaling that may allow one or more of the transmitter or receiver stations to dynamically activate/de-activate network coding. This signaling may involve the AP asking a STA, the STA asking the AP, or an AP asking another AP to activate network coding (e.g., with the client they are serving in the non-collocated case).

For example, in some cases, an AP/non-AP STA may request to (de)activate network coding transmissions based on the quality of the link. For example, the request may be based on various factors, such as a received signal strength indicator (RSSI), a basic service set (BSS) load, a signal to interference and noise ratio (SINR) threshold, and the type of traffic (e.g., such as latency sensitive traffic).

Network coding could be activated using various types of signaling mechanisms. For example, such signaling mechanisms may include an action frame (e.g., newly defined) that includes Network Coding parameters (e.g., coding type, Galois field, redundancy, matrix rank). Signaling mechanisms may also include Modified Block Ack signaling, for example, with modified add BA (ADDBA) and/or delete BA (DELBA) request and response or BA request (BAR) to include Network Coding parameters. Signaling mechanisms may also include a Stream Classification Service (SCS) request frame or an SCS response frame and/or a target wakeup time (TWT) setup frame (which may be a request frame or a response frame. The TWT setup frame may be a restricted, broadcast, or individual TWT setup frame. In some cases, a TWT element may also be included in a beacon frame.

Aspects of the present disclosure also provide various options for Non-AP STA feedback and scheduler calibration that may enable a non-AP STA to report certain delivery reliability metrics, such as a measured MSDU deliver ratio.

A Multi-link SCS mechanism has been introduced in some systems (e.g., 802.11 be) in which a non-AP STA informs the AP about its QoS requirements for a traffic steam may be used. A quality of service (QoS) Characteristics IE in the SCS request/response may include a MSDU Delivery Ratio field that indicates the target reliability (percentage of MSDUs that are expected to be delivered within the delay bound). Unfortunately, current systems do not provide a mechanism for a non-AP STA to provide feedback about achieved reliability to the AP during the session.

Thus, to support stringent reliability requirements, aspects of the present disclosure provide signaling mechanisms to enable the non-AP STA to report the actual achieved MSDU delivery ratio during the session.

Figure 7:
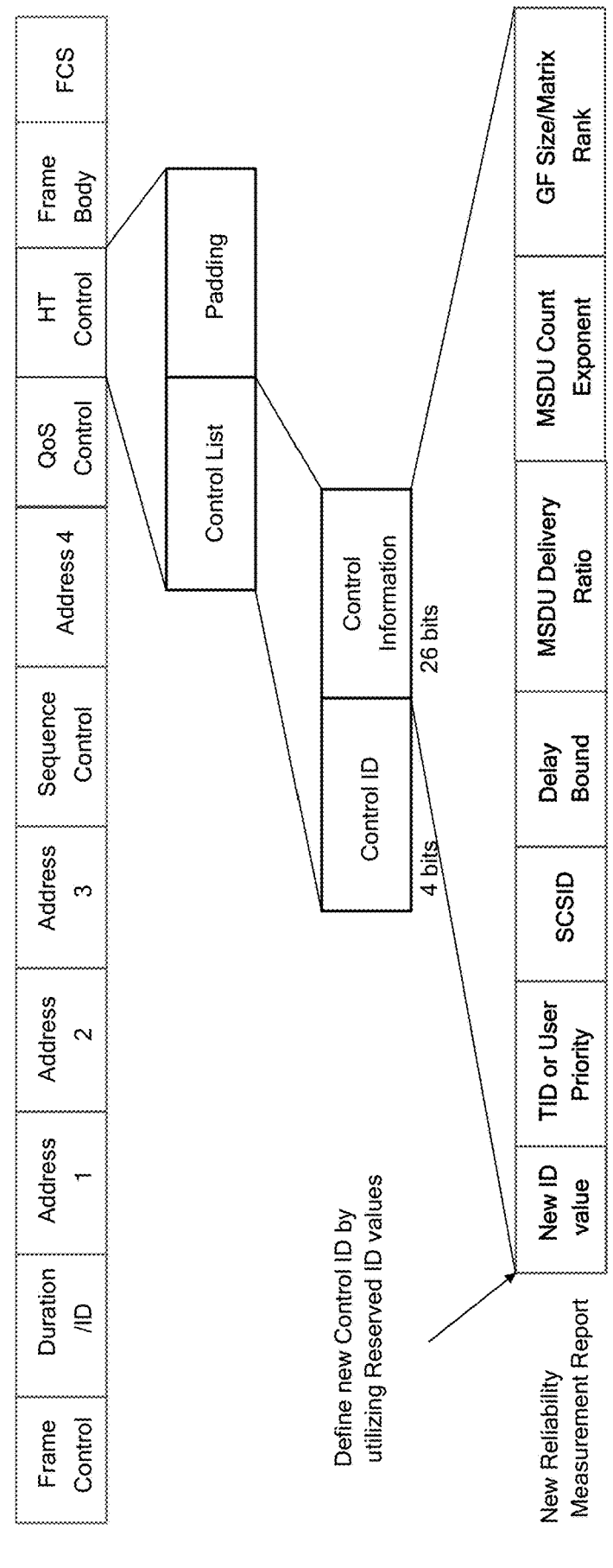
FIG. 7 depicts an example signaling mechanism for providing feedback for network coding based MLD transmissions, in accordance with aspects of the present disclosure.

For example, FIG. 7 illustrates an example Reliability Measurement Report using new A-Control Field of MAC frame header, to deliver an actual achieved MSDU delivery ratio during the session. As illustrated in FIG. 7 such a new reliability measurement report may be delivered using a newly defined A-control field (e.g., defining a new Control ID by utilizing Reserved ID values). Based on the reported MSDU delivery ratio, the AP may adjust its scheduling decisions to help the non-AP STA achieve its target reliability requirements.

Figure 8:
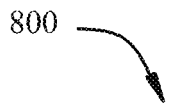
FIG. 8 depicts example values for a reliability measurement metric, in accordance with aspects of the present disclosure.

In general, the MSDU Delivery Ratio field indicates the percentage of MSDUs that were delivered within the delay bound specified in the Delay Bound field. Encoding of such a field may be defined as shown in the example table of (MSDU Deliver Ratio Field Values) shown in FIG. 8. In some cases, the MSDU Count Exponent field contains an unsigned integer that specifies the exponent from which the number of incoming MSDUs used for computing the MSDU delivery ratio is obtained. The number of incoming MSDUs is equal to $10^{MSDU\ Count\ Exponent}$.

Figure 9A:
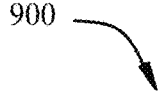
FIG. 9A and FIG. 9B depict an example MLD network utilizing network coding and example performance gains, in accordance with aspects of the present disclosure.
Figure 9A:
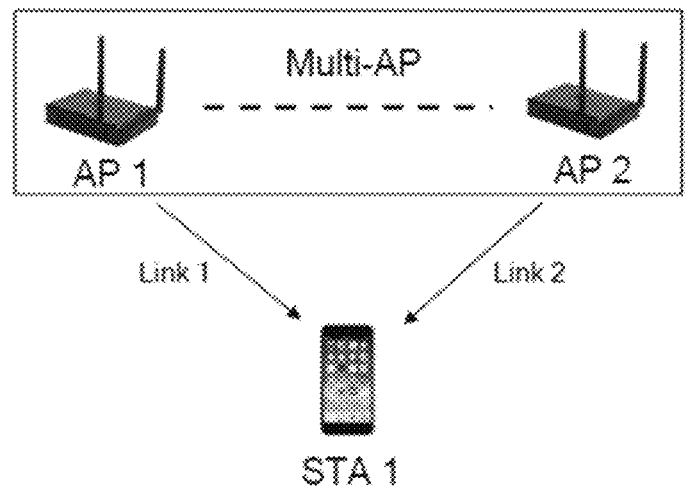
Figure 9A:

The potential benefits of network coding proposed herein may be demonstrated by considering the example non-collocated example scenario shown in FIG. 9A. In the illustrated example, a station STA1 has two links with AP1 (Link 1) and AP2 (Link 2). Depending on link conditions, network coding could be activated on Link 1, Link 2, or both.

Figure 9B:
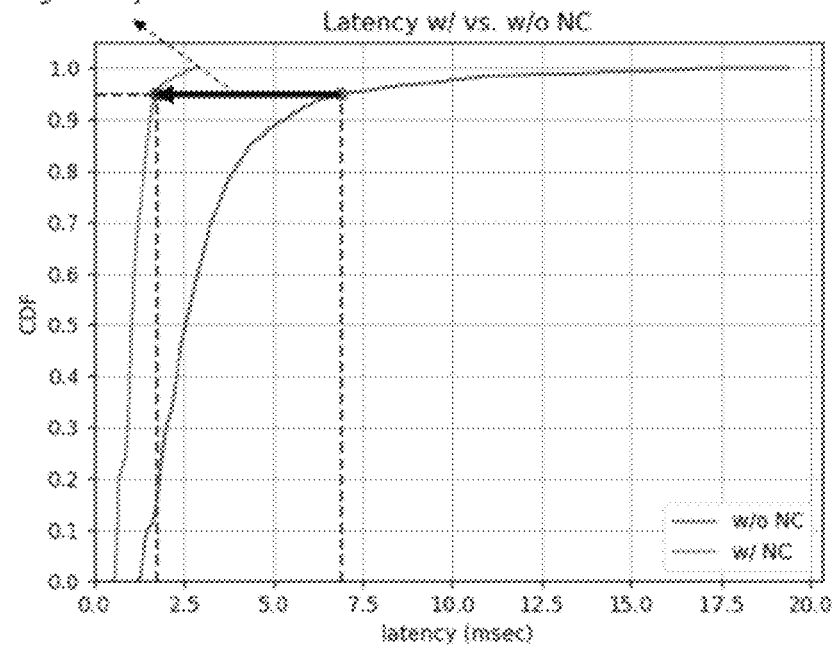

As illustrated in the example results shown in FIG. 9B, when compared to the scenario without network coding, latency (at 95% point of a cumulative distribution function CDF), network coding may reduce latency significantly (e.g., from approximately 7.5 ms to 2 ms in the illustrated example). The illustrated example may assume a retry count for the baseline (no network coding) that allows 7 re-transmissions. Network coding for the illustrated example may assume values of (K=4, N=4). The baseline scenario may assume K MSDUs are transmitted as K MPDUs, while the network coded scenario assumes K MSDUs transmitted as N+K MDPUs. The example may assume independent random propagation loss per link (e.g., 30% loss per link), MSDU Size of 1504 bytes. Network Coding parameters may be assumed as Random Linear Network Coding (and network coding based on other types of codes, such as RaptorQ codes). GF(256), Transmit once w/100% Redundancy, and PHY parameters of 20 MHz and modulation and coding scheme MCS7.

Example Operations of MLDs

Figure 10:
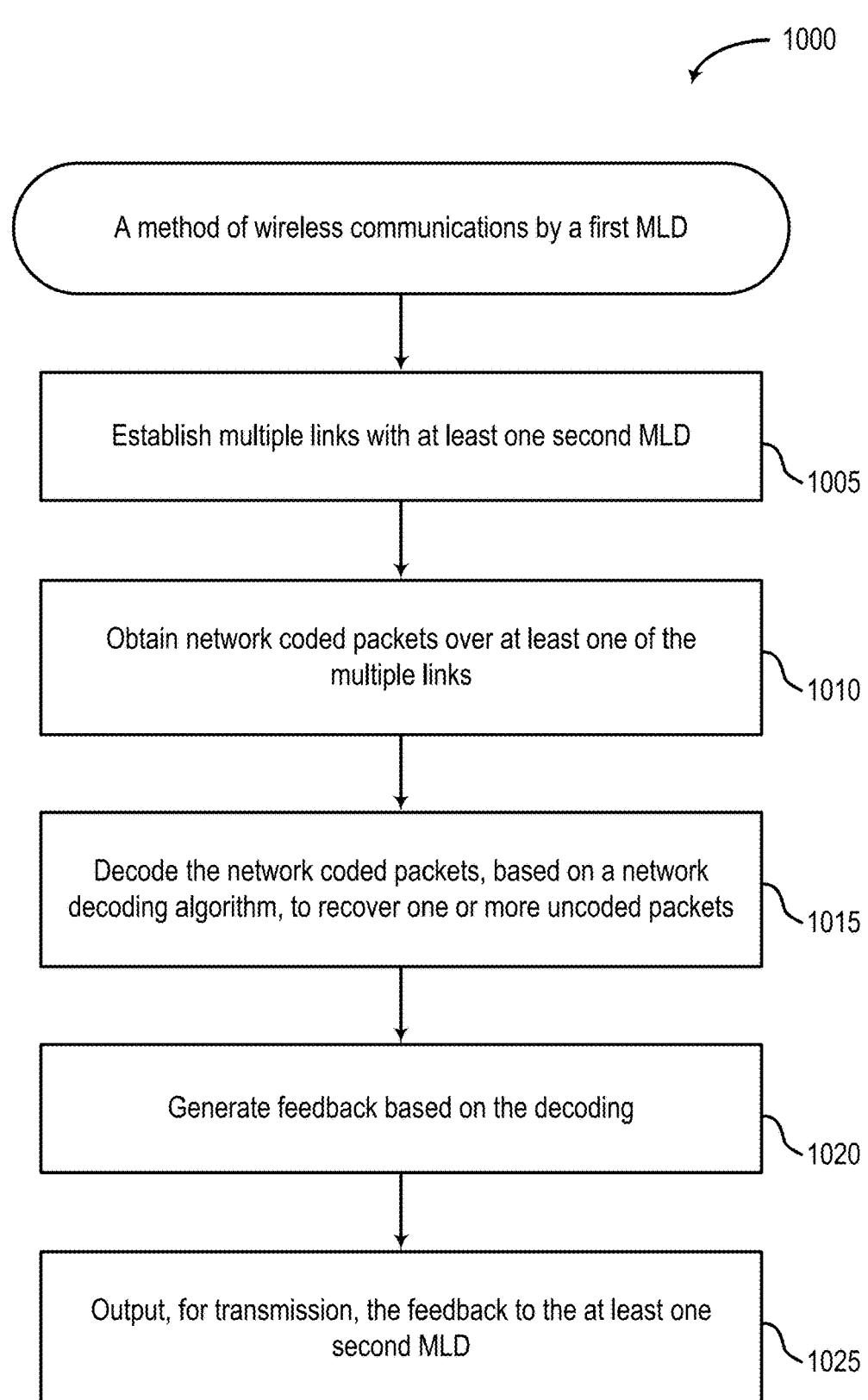
FIG. 10 depicts a method for wireless communications.

FIG. 10 shows a method 1000 for wireless communications by a first MLD, such as an AP 110 of FIGS. 1 and 2 and/or a STA 120 of FIGS. 1 and 2.

Method 1000 begins at 1005 with establishing multiple links with at least one second MLD. In some cases, the operations of this step refer to, or may be performed by, link establishment circuitry and/or link establishment code as described with reference to FIG. 12.

Method 1000 then proceeds to step 1010 with obtaining network coded packets over at least one of the multiple links. In some cases, the operations of this step refer to, or may be performed by, obtaining circuitry and/or obtaining code as described with reference to FIG. 12.

Method 1000 then proceeds to step 1015 with decoding the network coded packets, based on a network decoding algorithm, to recover one or more uncoded packets. In some cases, the operations of this step refer to, or may be performed by, decoding circuitry and/or decoding code as described with reference to FIG. 12.

Method 1000 then proceeds to step 1020 with generating feedback based on the decoding. In some cases, the operations of this step refer to, or may be performed by, feedback generation circuitry and/or feedback generation code as described with reference to FIG. 12.

Method 1000 then proceeds to step 1025 with outputting, for transmission, the feedback to the at least one second MLD. In some cases, the operations of this step refer to, or may be performed by, outputting circuitry and/or outputting code as described with reference to FIG. 12.

In some aspects, the at least one second MLD comprises: at least two collocated APs.

In some aspects, the first MLD comprises a non AP station and the at least one second MLD comprise at least one AP; or the first MLD comprises at least one AP and the at least one second MLD comprise at least one non-AP station.

In some aspects, the network packets are output for transmission from the at least one second MLD without retransmissions.

In some aspects, the method 1000 further includes obtaining an indication of a network coding redundancy parameter based on at least one of: the feedback or one or more conditions of one or more of the multiple links. In some cases, the operations of this step refer to, or may be performed by, obtaining circuitry and/or obtaining code as described with reference to FIG. 12.

In some aspects, the one or more of the network coded packets are network coded packets that are output for retransmission from the at least one second MLD based on the feedback.

In some aspects, the method 1000 further includes obtaining, from the at least one second MLD, an indication of sequence numbers of the uncoded packets; and providing an indication of sequence numbers of correctly recovered uncoded packets. In some cases, the operations of this step refer to, or may be performed by, obtaining circuitry and/or obtaining code as described with reference to FIG. 12. In some cases, the operations of this step refer to, or may be performed by, indication circuitry and/or indication code as described with reference to FIG. 12.

In some aspects, the indication of sequence numbers is provided via a bitmap.

In some aspects, the method 1000 further includes at least one of: obtaining a request, from the at least one second MLD, that network coding of packets is to be activated; outputting, for transmission to the at least one second MLD, a request for the second MLD to activate network coding of packets; outputting, for transmission to at least one third MLD, a request for the third MLD to activate network coding of packets. In some cases, the operations of this step refer to, or may be performed by, obtaining circuitry and/or obtaining code as described with reference to FIG. 12. In some cases, the operations of this step refer to, or may be performed by, outputting circuitry and/or outputting code as described with reference to FIG. 12.

In some aspects, the request is signaled via: an action fame that includes network coding parameters; modified Block Ack signaling; a SCS request frame or an SCS response frame; or a TWT request frame or a TWT response frame.

In some aspects, the feedback comprises a metric indicative of reliability of uncoded packet delivery observed at the first MLD.

In some aspects, the metric comprises an uncoded packet delivery ratio observed at the first MLD.

In some aspects, the metric is provided in a field of a MAC frame header; and different values of the field map to different uncoded packet delivery ratio values.

Figure 12:
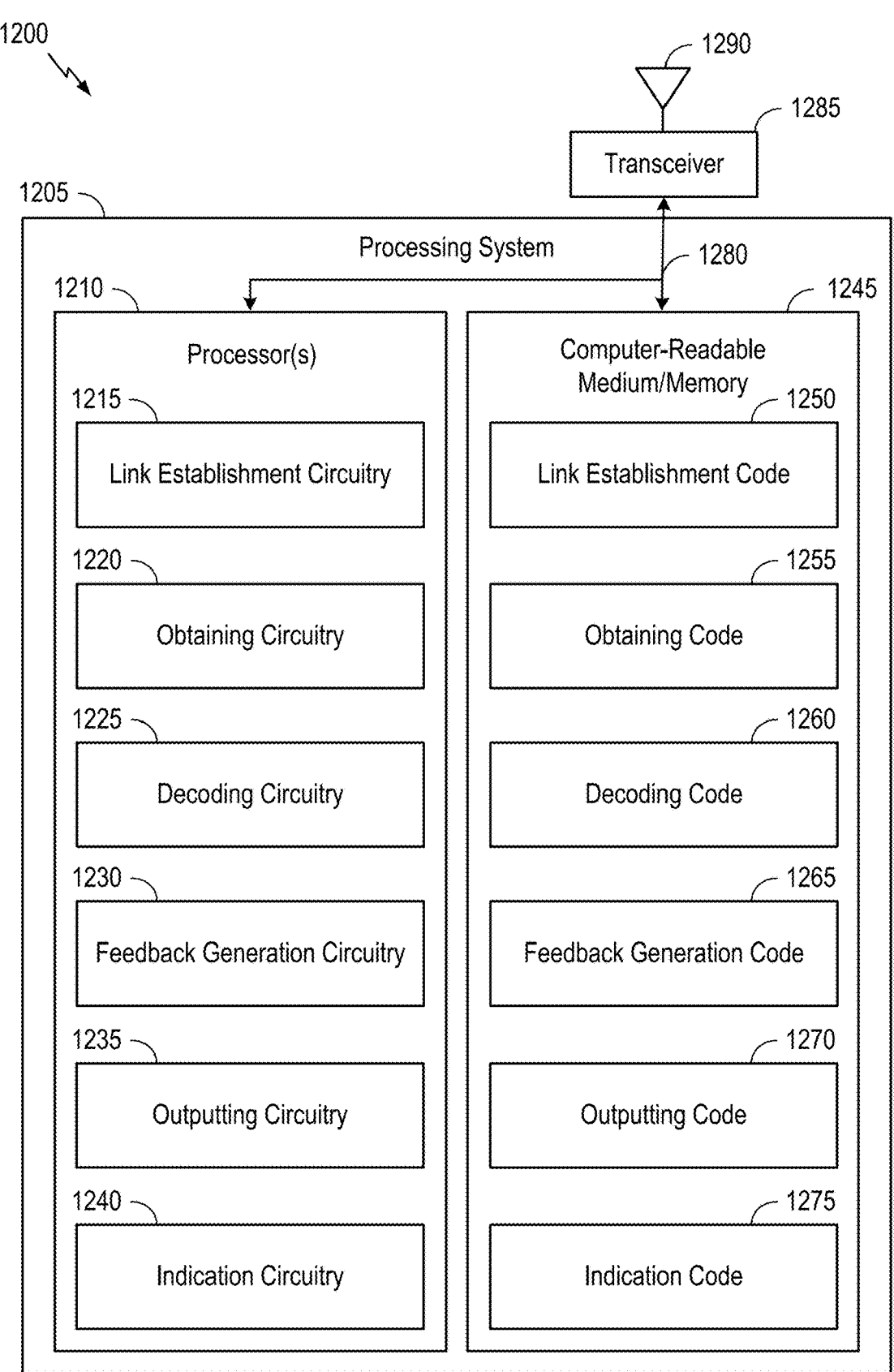
FIG. 12 depicts aspects of an example communications device.

In one aspect, method 1000, or any aspect related to it, may be performed by an apparatus, such as communications device 1200 of FIG. 12, which includes various components operable, configured, or adapted to perform the method 1000. Communications device 1200 is described below in further detail.

Note that FIG. 10 is just one example of a method, and other methods including fewer, additional, or alternative steps are possible consistent with this disclosure.

Figure 11:
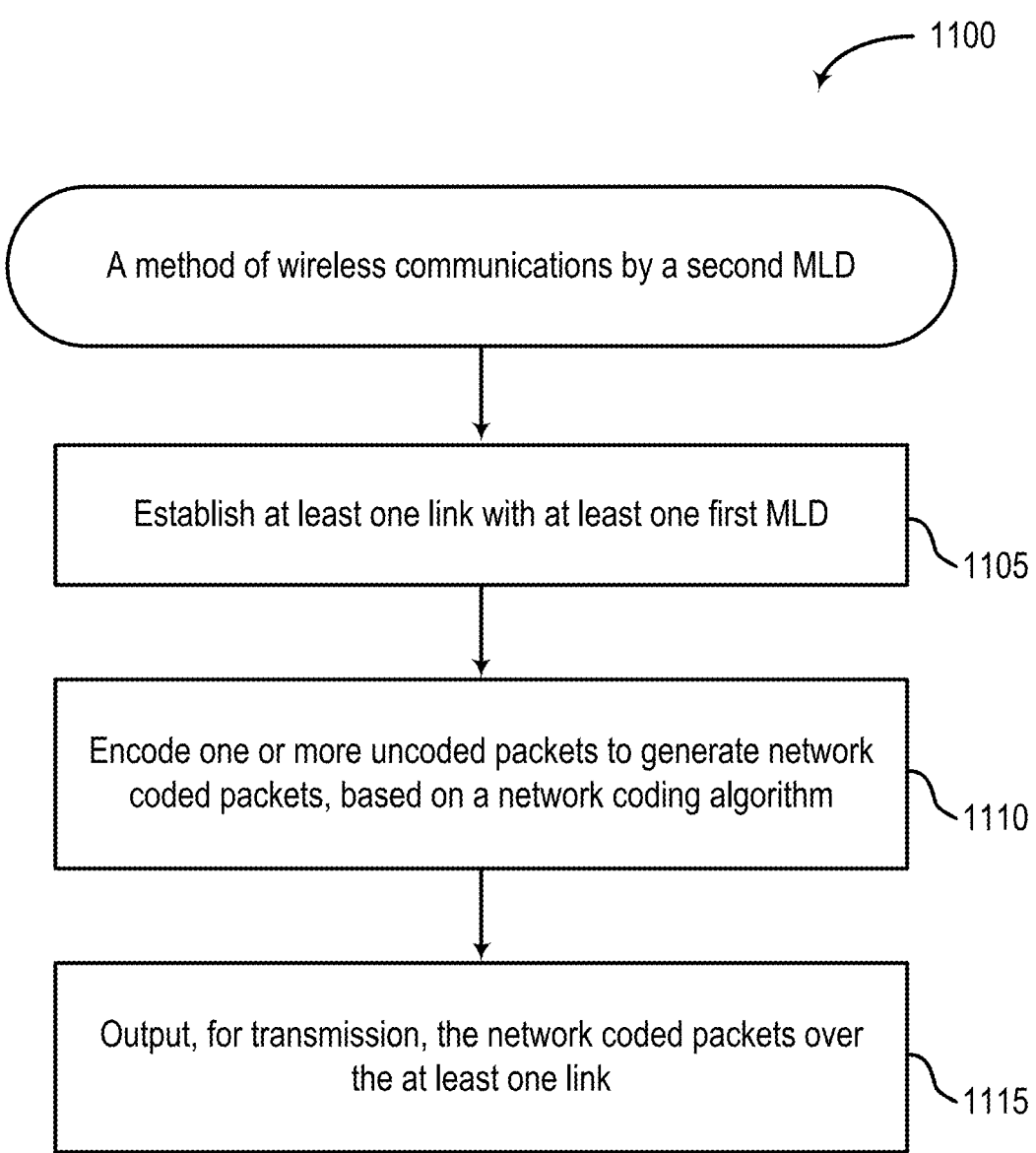
FIG. 11 depicts a method for wireless communications.

FIG. 11 shows a method 1100 for wireless communications by a second MLD, such as an AP 110 of FIGS. 1 and 2 and/or a STA 120 of FIGS. 1 and 2.

Method 1100 begins at 1105 with establishing at least one link with at least one first MLD. In some cases, the operations of this step refer to, or may be performed by, link establishment circuitry and/or link establishment code as described with reference to FIG. 13.

Method 1100 then proceeds to step 1110 with encoding one or more uncoded packets to generate network coded packets, based on a network coding algorithm. In some cases, the operations of this step refer to, or may be performed by, encoding circuitry and/or encoding code as described with reference to FIG. 13.

Method 1100 then proceeds to step 1115 with outputting, for transmission, the network coded packets over the at least one link. In some cases, the operations of this step refer to, or may be performed by, outputting circuitry and/or outputting code as described with reference to FIG. 13.

In some aspects, the second MLD comprises at least two collocated APs.

In some aspects, the at least one first MLD comprises a non AP station and the second MLD comprise at least one AP; or the at least one first MLD comprises at least one AP and the second MLD comprise at least one non-AP station.

In some aspects, the network coded packets are output for transmission as unicast frames or multicast frames.

In some aspects, the method 1100 further includes obtaining the network coded packets from at least one third MLD device; decoding the network coded packets; and encoding the network packets prior to outputting, for transmission, the network coded packets over the at least one link. In some cases, the operations of this step refer to, or may be performed by, obtaining circuitry and/or obtaining code as described with reference to FIG. 13. In some cases, the operations of this step refer to, or may be performed by, decoding circuitry and/or decoding code as described with reference to FIG. 13. In some cases, the operations of this step refer to, or may be performed by, encoding circuitry and/or encoding code as described with reference to FIG. 13.

In some aspects, the network packets are output for transmission from the at least one second MLD without retransmissions.

In some aspects, the method 1100 further includes outputting, for transmission over the at least one link, an indication of a network coding redundancy parameter based on at least one of: feedback obtained from the at least one first MLD or one or more conditions of one or more of the multiple links. In some cases, the operations of this step refer to, or may be performed by, outputting circuitry and/or outputting code as described with reference to FIG. 13.

In some aspects, the one or more of the network coded packets are network coded packets that are output for retransmission based on feedback obtained from the at least one first MLD.

In some aspects, the method 1100 further includes determining which of the network coded packets to output for retransmission based on the feedback and one or more coded vectors used when encoding the one or more uncoded packets to generate the network coded packets. In some cases, the operations of this step refer to, or may be performed by, determination circuitry and/or determination code as described with reference to FIG. 13.

In some aspects, the method 1100 further includes outputting, for transmission over the at least one link, an indication of sequence numbers of the uncoded packets. Some examples further include obtaining, from the at least one first MLD, an indication of sequence numbers of correctly recovered uncoded packets. In some cases, the operations of this step refer to, or may be performed by, outputting circuitry and/or outputting code as described with reference to FIG. 13.

In some aspects, the indication of sequence numbers is obtained via a bitmap.

In some aspects, the method 1100 further includes at least one of: obtaining a request, from the at least one first MLD, that network coding of packets is to be activated; outputting, for transmission to the at least one first MLD, a request for the second MLD to activate network coding of packets; and outputting, for transmission to at least one third MLD, a request for the third MLD to activate network coding of packets. In some cases, the operations of this step refer to, or may be performed by, obtaining circuitry and/or obtaining code as described with reference to FIG. 13. In some cases, the operations of this step refer to, or may be performed by, outputting circuitry and/or outputting code as described with reference to FIG. 13.

In some aspects, the request is signaled via: an action fame that includes network coding parameters; modified Block Ack signaling; a SCS request frame or an SCS response frame; or a TWT request frame or a TWT response frame.

In some aspects, the method 1100 further includes obtaining feedback from the at least one first MLD, wherein the feedback comprises a metric indicative of reliability of uncoded packet delivery observed at the first MLD. In some cases, the operations of this step refer to, or may be performed by, obtaining circuitry and/or obtaining code as described with reference to FIG. 13.

In some aspects, the metric comprises an uncoded packet delivery ratio observed at the first MLD.

In some aspects, the metric is obtained in a field of a MAC frame header; and different values of the field map to different uncoded packet delivery ratio values.

In one aspect, method 1100, or any aspect related to it, may be performed by an apparatus, such as communications device 1300 of FIG. 13, which includes various components operable, configured, or adapted to perform the method 1100. Communications device 1300 is described below in further detail.

Note that FIG. 11 is just one example of a method, and other methods including fewer, additional, or alternative steps are possible consistent with this disclosure.

Example Communications Devices

FIG. 12 depicts aspects of an example communications device 1200. In some aspects, communications device 1200 is a first MLD, such as an AP 110 and/or a STA 120 described above with respect to FIGS. 1 and 2.

The communications device 1200 includes a processing system 1205 coupled to the transceiver 1285 (e.g., a transmitter and/or a receiver). The transceiver 1285 is configured to transmit and receive signals for the communications device 1200 via the antenna 1290, such as the various signals as described herein. Transceiver 1285 may be an example of aspects of the transceiver 254 described with reference to FIG. 2. The processing system 1205 may be configured to perform processing functions for the communications device 1200, including processing signals received and/or to be transmitted by the communications device 1200.

The processing system 1205 includes one or more processors 1210. In various aspects, the one or more processors 1210 may be representative of one or more of RX data processor 242, the TX data processor 210, the TX spatial processor 220, or the controller 230 of AP 110 or the RX data processor 270, the TX data processor 288, the TX spatial processor 290, or the controller 280 of STA 120 illustrated in FIG. 2. The one or more processors 1210 are coupled to a computer-readable medium/memory 1245 via a bus 1280. In certain aspects, the computer-readable medium/memory 1245 is configured to store instructions (e.g., computer-executable code) that when executed by the one or more processors 1210, cause the one or more processors 1210 to perform the method 1000 described with respect to FIG. 10, or any aspect related to it. Note that reference to a processor performing a function of communications device 1200 may include one or more processors 1210 performing that function of communications device 1200.

In the depicted example, computer-readable medium/memory 1245 stores code (e.g., executable instructions), such as link establishment code 1250, obtaining code 1255, decoding code 1260, feedback generation code 1265, outputting code 1270, and indication code 1275. Processing of the link establishment code 1250, obtaining code 1255, decoding code 1260, feedback generation code 1265, outputting code 1270, and indication code 1275 may cause the communications device 1200 to perform the method 1000 described with respect to FIG. 10, or any aspect related to it.

The one or more processors 1210 include circuitry configured to implement (e.g., execute) the code stored in the computer-readable medium/memory 1245, including circuitry such as link establishment circuitry 1215, obtaining circuitry 1220, decoding circuitry 1225, feedback generation circuitry 1230, outputting circuitry 1235, and indication circuitry 1240. Processing with link establishment circuitry 1215, obtaining circuitry 1220, decoding circuitry 1225, feedback generation circuitry 1230, outputting circuitry 1235, and indication circuitry 1240 may cause the communications device 1200 to perform the method 1000 described with respect to FIG. 10, or any aspect related to it.

Various components of the communications device 1200 may provide means for performing the method 1000 described with respect to FIG. 10, or any aspect related to it. For example, means for transmitting, sending or outputting for transmission may include the transmitter unit 222 or an antenna(s) 224 of AP 110 or the transmitter unit 254 or antenna(s) 252 of the STA 120 illustrated in FIG. 2 and/or the transceiver 1285 and the antenna 1290 of the communications device 1200 in FIG. 12. Means for receiving or obtaining may include the receiver unit 222 or an antenna(s) 224 of AP 110 or the receiver unit 254 or antenna(s) 252 of STA 120 illustrated in FIG. 2 and/or the transceiver 1285 and the antenna 1290 of the communications device 1200 in FIG. 12.

FIG. 13 depicts aspects of an example communications device 1300. In some aspects, communications device 1300 is a second MLD, such as an AP 110 and/or a STA 120 described above with respect to FIGS. 1 and 2.

The communications device 1300 includes a processing system 1305 coupled to the transceiver 1385 (e.g., a transmitter and/or a receiver). The transceiver 1385 is configured to transmit and receive signals for the communications device 1300 via the antenna 1390, such as the various signals as described herein. Transceiver 1385 may be an example of aspects of the transceiver 254 described with reference to FIG. 2. The processing system 1305 may be configured to perform processing functions for the communications device 1300, including processing signals received and/or to be transmitted by the communications device 1300.

The processing system 1305 includes one or more processors 1310. In various aspects, the one or more processors 1310 may be representative of one or more of RX data processor 242, the TX data processor 210, the TX spatial processor 220, or the controller 230 of AP 110 or the RX data processor 270, the TX data processor 288, the TX spatial processor 290, or the controller 280 of STA 120 illustrated in FIG. 2. The one or more processors 1310 are coupled to a computer-readable medium/memory 1345 via a bus 1380. In certain aspects, the computer-readable medium/memory 1345 is configured to store instructions (e.g., computer-executable code) that when executed by the one or more processors 1310, cause the one or more processors 1310 to perform the method 1100 described with respect to FIG. 11, or any aspect related to it. Note that reference to a processor performing a function of communications device 1300 may include one or more processors 1310 performing that function of communications device 1300.

In the depicted example, computer-readable medium/memory 1345 stores code (e.g., executable instructions), such as link establishment code 1350, encoding code 1355, outputting code 1360, obtaining code 1365, decoding code 1370, and determination code 1375. Processing of the link establishment code 1350, encoding code 1355, outputting code 1360, obtaining code 1365, decoding code 1370, and determination code 1375 may cause the communications device 1300 to perform the method 1100 described with respect to FIG. 11, or any aspect related to it.

The one or more processors 1310 include circuitry configured to implement (e.g., execute) the code stored in the computer-readable medium/memory 1345, including circuitry such as link establishment circuitry 1315, encoding circuitry 1320, outputting circuitry 1325, obtaining circuitry 1330, decoding circuitry 1335, and determination circuitry 1340. Processing with link establishment circuitry 1315, encoding circuitry 1320, outputting circuitry 1325, obtaining circuitry 1330, decoding circuitry 1335, and determination circuitry 1340 may cause the communications device

1300 to perform the method 1100 described with respect to FIG. 11, or any aspect related to it.

Various components of the communications device 1300 may provide means for performing the method 1100 described with respect to FIG. 11, or any aspect related to it. For example, means for transmitting, sending or outputting for transmission may include the transmitter unit 222 or an antenna(s) 224 of AP 110 or the transmitter unit 254 or antenna(s) 252 of the STA 120 illustrated in FIG. 2 and/or the transceiver 1385 and the antenna 1390 of the communications device 1300 in FIG. 13. Means for receiving or obtaining may include the receiver unit 222 or an antenna(s) 224 of AP 110 or the receiver unit 254 or antenna(s) 252 of STA 120 illustrated in FIG. 2 and/or the transceiver 1385 and the antenna 1390 of the communications device 1300 in FIG. 13.

Means for establishing, means for decoding, means, for generating, means for providing, and/or means for encoding may include any of the various processors and/or transceivers shown in FIG. 2, 12, or 13.

Example Clauses

Implementation examples are described in the following numbered clauses:

Clause 1: A method of wireless communications by a first MLD, comprising: establishing multiple links with at least one second MLD; obtaining network coded packets over at least one of the multiple links; decoding the network coded packets, based on a network decoding algorithm, to recover one or more uncoded packets; generating feedback based on the decoding; and outputting, for transmission, the feedback to the at least one second MLD.

Clause 2: The method of Clause 1, wherein the at least one second MLD comprises: at least two collocated APs.

Clause 3: The method of any one of Clauses 1 and 2, wherein: the first MLD comprises a non AP station and the at least one second MLD comprise at least one AP; or the first MLD comprises at least one AP and the at least one second MLD comprise at least one non-AP station.

Clause 4: The method of any one of Clauses 1-3, wherein the network packets are output for transmission from the at least one second MLD without retransmissions.

Clause 5: The method of any one of Clauses 1-4, further comprising: obtaining an indication of a network coding redundancy parameter based on at least one of: the feedback or one or more conditions of one or more of the multiple links.

Clause 6: The method of any one of Clauses 1-5, wherein the one or more of the network coded packets are network coded packets that are output for retransmission from the at least one second MLD based on the feedback.

Clause 7: The method of any one of Clauses 1-6, further comprising: obtaining, from the at least one second MLD, an indication of sequence numbers of the uncoded packets; and providing an indication of sequence numbers of correctly recovered uncoded packets.

Clause 8: The method of Clause 7, wherein the indication of sequence numbers is provided via a bitmap.

Clause 9: The method of any one of Clauses 1-8, further comprising at least one of: obtaining a request, from the at least one second MLD, that network coding of packets is to be activated; outputting, for transmission to the at least one second MLD, a request for the second MLD to activate network coding of packets; or outputting, for transmission to at least one third MLD, a request for the third MLD to activate network coding of packets.

Clause 10: The method of Clause 9, wherein the request is signaled via: an action fame that includes network coding parameters; modified Block Ack signaling; a SCS request frame or an SCS response frame; or a TWT request frame or a TWT response frame.

Clause 11: The method of any one of Clauses 1-10, wherein the feedback comprises a metric indicative of reliability of uncoded packet delivery observed at the first MLD.

Clause 12: The method of Clause 11, wherein the metric comprises an uncoded packet delivery ratio observed at the first MLD.

Clause 13: The method of Clause 11, wherein: the metric is provided in a field of a MAC frame header; and different values of the field map to different uncoded packet delivery ratio values.

Clause 14: A method of wireless communications by a second MLD, comprising: establishing at least one link with at least one first MLD; encoding one or more uncoded packets to generate network coded packets, based on a network coding algorithm; and outputting, for transmission, the network coded packets over the at least one link.

Clause 15: The method of Clause 14, wherein the second MLD comprises: at least two collocated APs.

Clause 16: The method of any one of Clauses 14 and 15, wherein: the at least one first MLD comprises a non AP station and the second MLD comprise at least one AP; or the at least one first MLD comprises at least one AP and the second MLD comprise at least one non-AP station.

Clause 17: The method of any one of Clauses 14-16, wherein: the network coded packets are output for transmission as unicast frames or multicast frames.

Clause 18: The method of any one of Clauses 14-17, further comprising: obtaining the network coded packets from at least one third MLD device; decoding the network coded packets; and encoding the network packets prior to outputting, for transmission, the network coded packets over the at least one link.

Clause 19: The method of any one of Clauses 14-18, wherein the network packets are output for transmission from the at least one second MLD without retransmissions.

Clause 20: The method of any one of Clauses 14-19, further comprising: outputting, for transmission over the at least one link, an indication of a network coding redundancy parameter based on at least one of: feedback obtained from the at least one first MLD or one or more conditions of one or more of the multiple links.

Clause 21: The method of any one of Clauses 14-20, wherein the one or more of the network coded packets are network coded packets that are output for retransmission based on feedback obtained from the at least one first MLD.

Clause 22: The method of Clause 21, further comprising: determining which of the network coded packets to output for retransmission based on the feedback and one or more coded vectors used when encoding the one or more uncoded packets to generate the network coded packets.

Clause 23: The method of any one of Clauses 14-22, further comprising: outputting, for transmission over the at least one link, an indication of sequence numbers of the uncoded packets; and obtaining, from the at least one first MLD, an indication of sequence numbers of correctly recovered uncoded packets.

Clause 24: The method of Clause 23, wherein the indication of sequence numbers is obtained via a bitmap.

Clause 25: The method of any one of Clauses 14-24, further comprising at least one of: obtaining a request, from the at least one first MLD, that network coding of packets is to be activated; outputting, for transmission to the at least one first MLD, a request for the second MLD to activate network coding of packets; or outputting, for transmission to at least one third MLD, a request for the third MLD to activate network coding of packets.

Clause 26: The method of Clause 25, wherein the request is signaled via: an action fame that includes network coding parameters; modified Block Ack signaling; a SCS request frame or an SCS response frame; or a TWT request frame or a TWT response frame.

Clause 27: The method of any one of Clauses 14-26, further comprising: obtaining feedback from the at least one first MLD, wherein the feedback comprises a metric indicative of reliability of uncoded packet delivery observed at the first MLD.

Clause 28: The method of Clause 27, wherein the metric comprises an uncoded packet delivery ratio observed at the first MLD.

Clause 29: The method of Clause 27, wherein: the metric is obtained in a field of a MAC frame header; and different values of the field map to different uncoded packet delivery ratio values.

Clause 30: An apparatus, comprising means for performing a method in accordance with any one of Clauses 1-29.

Clause 31: A non-transitory computer-readable medium comprising executable instructions that, when executed by a processor of an apparatus, cause the apparatus to perform a method in accordance with any one of Clauses 1-29.

Clause 32: A computer program product embodied on a computer-readable storage medium comprising code for performing a method in accordance with any one of Clauses 1-29.

Clause 33: An apparatus, comprising: a memory comprising executable instructions; and a processor configured to execute the executable instructions and cause the apparatus to perform a method in accordance with any one of Clauses 1-13.

Clause 34: An apparatus, comprising: a memory comprising executable instructions; and a processor configured to execute the executable instructions and cause the apparatus to perform a method in accordance with any one of Clauses 1-13, wherein the apparatus further comprises at least one transceiver configured to at least one of receive the network coded packets or transmit the feedback, wherein the apparatus is configured as an MLD.

Clause 35: An apparatus, comprising: a memory comprising executable instructions; and a processor configured to execute the executable instructions and cause the apparatus to perform a method in accordance with any one of Clauses 14-29, wherein Clause 36: An apparatus, comprising: a memory comprising executable instructions; and a processor configured to execute the executable instructions and cause the apparatus to perform a method in accordance with any one of Clauses 14-29, wherein the apparatus further comprises at least one transceiver configured to at least one of transmit the network coded packets or receive the feedback, wherein the apparatus is configured as an MLD.

Additional Considerations

The preceding description is provided to enable any person skilled in the art to practice the various aspects described herein. The examples discussed herein are not limiting of the scope, applicability, or aspects set forth in the claims. Various modifications to these aspects will be readily apparent to those skilled in the art, and the general principles defined herein may be applied to other aspects. For example, changes may be made in the function and arrangement of elements discussed without departing from the scope of the disclosure. Various examples may omit, substitute, or add various procedures or components as appropriate. For instance, the methods described may be performed in an order different from that described, and various actions may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

The various illustrative logical blocks, modules and circuits described in connection with the present disclosure may be implemented or performed with a general purpose processor, a digital signal processor (DSP), an ASIC, a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, a system on a chip (SoC), or any other such configuration.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more actions for achieving the methods. The method actions may be interchanged with one another without departing from the scope of the claims. In other words, unless a specific order of actions is specified, the order and/or use of specific actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor.

The following claims are not intended to be limited to the aspects shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for". All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A wireless node, comprising:
at least one transceiver;
one or more memories memory comprising instructions; and
one or more processors configured to execute the instructions to cause the wireless node to:
establish, at the wireless node, multiple links with at least one second wireless node;
receive, via the at least one transceiver, a plurality of network coded medium access control (MAC) protocol data units (MPDUs) via the multiple links, wherein at least one of the plurality of network coded MPDUs is based on multiple uncoded source MAC service data units (MSDUs) of a plurality of uncoded source MSDUs;
decode, based on a network decoding algorithm, the plurality of network coded MPDUs to obtain one or more uncoded source MSDUs of the plurality of uncoded source MSDUs, wherein a quantity of the plurality of uncoded source MSDUs is equal to or fewer than a quantity of the plurality of network coded MPDUs;
generate feedback based on the decoding; and
transmit, via the at least one transceiver, the feedback to the at least one second wireless node.

2. The wireless node of claim 1, wherein the at least one second wireless node comprises at least two collocated access points (APs).

3. The wireless node of claim 1, wherein:
the wireless node is configured as a non-access point (non AP) station (STA) and the at least one second wireless node comprises at least one AP; or
the wireless node is configured as at least one AP and the at least one second wireless node comprises at least one non-AP STA.

4. The wireless node of claim 1, wherein the one or more processors are configured to cause the wireless node to receive, via the at least one transceiver, the plurality of network coded MPDUs without retransmissions.

5. The wireless node of claim 1, wherein the one or more processors are further configured to cause the wireless node to receive, via the at least one transceiver, an indication of one or more network coding parameters based on at least one of: the feedback or one or more conditions associated with one or more of the multiple links.

6. The wireless node of claim 1, wherein the one or more processors are configured to cause the wireless node to receive, via the at least one transceiver, one or more of the plurality of network coded MPDUs retransmitted from the at least one second wireless node in response to the feedback from the wireless node.

7. The wireless node of claim 1, wherein the one or more processors are further configured to cause the the wireless node to receive, via the at least one transceiver, from the at least one second wireless node, an indication of one or more sequence numbers of the one or more uncoded source MSDUs, and wherein the feedback includes an indication of the sequence numbers of the one or more uncoded source MSDUs that are correctly recovered.

8. The wireless node of claim 7, wherein the indication of the one or more sequence numbers is provided via a bitmap.

9. The wireless node of claim 1, wherein the one or more processors are further configured to cause the wireless node to at least one of:

receive, via the at least one transceiver, a request, from the at least one second wireless node, that network coding of MPDUs is to be activated;

transmit, via the at least one transceiver, to the at least one second wireless node, a request for the second wireless node to activate network coding of MPDUs; or transmit, via the at least one transceiver, to at least one third wireless node, a request for the third wireless node to activate network coding of MPDUs.

10. The wireless node of claim 9, wherein at least one of the request from the at least one second wireless node, the request to the at least one second wireless node, or the request to the third wireless node is signaled via:

an action fame that includes network coding parameters;

modified block acknowledgment (Block Ack) signaling;

a Stream Classification Service (SCS) request frame;

an SCS response frame;

a target wakeup time (TWT) request frame; or a TWT response frame.

11. The wireless node of claim 1, wherein the feedback comprises a metric indicative of reliability of uncoded MSDU delivery observed at the wireless node.

12. The wireless node of claim 11, wherein the metric comprises an uncoded MSDU delivery ratio observed at the wireless node.

13. The wireless node of claim 11, wherein at least one of:

the feedback comprises a medium access control (MAC) frame;

the metric is provided in a field of a header of the MAC frame; or different values of a field map to different uncoded MSDU delivery ratio values.

14. The wireless node of claim 1, wherein: the wireless node is configured as a multi-link device (MLD).

15. An wireless node, comprising:

at least one transceiver;

one or more memories memory comprising instructions; and one or more processors configured to execute the instructions to cause the wireless node to:

establish, at the wireless node, multiple links with at least one second wireless node; and encode a plurality of uncoded source MAC service data units (MSDUs) to generate a plurality of network coded medium access control (MAC) protocol data units (MPDUs), a quantity of the plurality of MPDUs being equal to or greater than a quantity of the plurality of uncoded source MSDUs, the encoding being based on a network coding algorithm, and wherein at least one of the plurality of network coded MPDUs is based on multiple uncoded source MSDUs of the plurality of uncoded source MSDUs; and transmit, via the at least one transceiver, the plurality of network coded MPDUs via the multiple links.

16. The wireless node of claim 15, wherein the plurality of network coded MPDUs are transmit via unicast frames or multicast frames.

17. The wireless node of claim 15, wherein the one or more processors are further configured to execute the instructions and cause the wireless node to:

(i) receive, via the at least one transceiver, the plurality of uncoded source MSDUs from at least one third wireless node; or (ii) transmit, via the at least one transceiver, a first plurality of network coded MPDUs from the at least one third wireless node; and decode the first plurality of network coded MPDUs to obtain the plurality of uncoded source MSDUs.

18. The wireless node of claim 15, wherein the plurality of network coded MPDUs are transmitted without retransmissions.

19. The wireless node of claim 15, wherein the one or more processors are further configured to cause the wireless node to transmit, via the at least one transceiver and via at least one of the multiple links, an indication of a network coding redundancy parameter based on at least one of: feedback obtained from the at least one second wireless node or one or more conditions of the at least one link.

20. The wireless node of claim 15, wherein the one or more processors are further configured to cause the wireless node to transmit, via the at least one transceiver, a subset of the plurality of network coded MPDUs for retransmission based on feedback obtained from the at least one second wireless node.

21. The wireless node of claim 20, wherein the subset of network coded MPDUs are transmitted further based on one or more coded vectors used when encoding the plurality of uncoded source MSDUs to generate the plurality of network coded MPDUs.

22. The wireless node of claim 15, wherein the one or more processors are further configured to cause the wireless node to:

transmit, via the at least one transceiver and via at least one of the multiple links, an indication of a plurality of sequence numbers of the plurality of uncoded source MSDUs; and receive, via the at least one transceiver, from the at least one second wireless node, an indication of one or more of the sequence numbers of one or more correctly recovered uncoded source MSDUs of the plurality of uncoded source MSDUs.

23. The wireless node of claim 22, wherein the indication of the one or more sequence numbers is obtained via a bitmap.

24. The wireless node of claim 15, wherein the one or more processors are further configured to cause the wireless node to at least one of:

receive, via the at least one transceiver, a request, from the at least one second wireless node, that network coding of MPDUs is to be activated;

transmit, via the at least one transceiver, to the at least one second wireless node, a request for the at least one second wireless node to activate network coding of MPDUs; or transmit, via the at least one transceiver, to at least one third wireless node, a request for the third wireless node to activate network coding of MPDUs.

25. The wireless node of claim 24, wherein the request from the at least one second wireless node, the request to the at least one second wireless node, or the request to the at least one third wireless node is signaled via:

an action fame that includes network coding parameters;

modified block acknowledgment (Block Ack) signaling;

a Stream Classification Service (SCS) request frame;

an SCS response frame;

a target wakeup time (TWT) request frame; or a TWT response frame.

26. The wireless node of claim 15, wherein:

the one or more processors are further configured to cause the wireless node to receive, via the at least one transceiver, feedback from the at least one second wireless node; and the feedback comprises a metric indicative of reliability of uncoded source MSDU delivery observed at the wireless node.

27. The wireless node of claim 26, wherein the metric comprises an uncoded source MSDU delivery ratio observed at the wireless node.

28. The wireless node of claim 26, wherein at least one of:

the feedback comprises a medium access control (MAC) frame;

the metric is obtained in a field of a header of the MAC frame; or different values of a field map to different uncoded source MSDU delivery ratio values.

29. The wireless node of claim 15, wherein the wireless node is configured as a multi-link device (MLD).

* * * * *